(12) United States Patent
Gupta et al.

(10) Patent No.: US 11,939,055 B2
(45) Date of Patent: Mar. 26, 2024

(54) WINGLETS WITH PASSIVE AEROELASTIC TAILORING

(71) Applicant: Toyota Motor Engineering & Manufacturing North America, Inc., Plano, TX (US)

(72) Inventors: Rikin Gupta, Ann Arbor, MI (US); Shardul Singh Panwar, Ann Arbor, MI (US); Taewoo Nam, Ann Arbor, MI (US); Ryohei Tsuruta, Ann Arbor, MI (US); Yufei Zhu, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/721,931

(22) Filed: Apr. 15, 2022

(65) Prior Publication Data

US 2023/0331371 A1    Oct. 19, 2023

(51) Int. Cl.
*B64C 3/38* (2006.01)
*B64C 23/06* (2006.01)
(Continued)

(52) U.S. Cl.
CPC ............. *B64C 3/38* (2013.01); *B64C 23/069* (2017.05); *B64C 31/06* (2013.01); *B64D 41/00* (2013.01); *B64C 2031/065* (2013.01)

(58) Field of Classification Search
CPC ... B64C 23/065; B64C 23/069; B64C 23/072; B64C 23/076
See application file for complete search history.

(56) References Cited

U.S. PATENT DOCUMENTS

| 1,841,921 A | 1/1932 | Spiegel |
| 2,565,990 A | 8/1951 | Richard |
| (Continued) | | |

FOREIGN PATENT DOCUMENTS

| CN | 105946515 A | 9/2016 |
| EP | 0772544 B1 | 2/2005 |
| (Continued) | | |

OTHER PUBLICATIONS

Acet et al., Magnetic-Field-Induced Effects in Martensitic Heusler-Based Magnetic Shape Memory Alloys, 2011, Elsevier, Handbook of Magnetic Materials, vol. 19, pp. 269-271 (Year: 2011).*

(Continued)

*Primary Examiner* — Timothy D Collins
*Assistant Examiner* — Justin Michael Heston
(74) *Attorney, Agent, or Firm* — Christopher G. Darrow; Darrow Mustafa PC

(57) ABSTRACT

An aircraft can include a wing. The wing can include a tip. A winglet can be pivotably connected to the wing proximate the tip. A connecting member can be operatively connected to the wing and the winglet. The connecting member can include a flexible material with a super elastic material member operatively connected to the flexible material. Thus, the connecting member can allow passive movement of the winglet responsive to real-time operational forces acting upon the aircraft. In some arrangements, the flexible material can be a fabric, and the super elastic material member can be a wire. In some arrangements, the super elastic material member can be configured to exhibit a non-linear stiffness profile. The non-linear stiffness profile can include a region of quasi-zero stiffness. The stiffness profile of the super elastic material member can be selectively varied, such as by controlling a temperature of the super elastic material member.

16 Claims, 11 Drawing Sheets

(51) Int. Cl.
*B64C 31/06* (2020.01)
*B64D 41/00* (2006.01)

(56) References Cited

U.S. PATENT DOCUMENTS

| | | | |
|---|---|---|---|
| 4,671,473 A | 6/1987 | Goodson | |
| 4,722,499 A | 2/1988 | Klug | |
| 5,072,894 A | 12/1991 | Cichy | |
| 5,114,104 A | 5/1992 | Cincotta et al. | |
| 5,529,458 A | 6/1996 | Humpherson | |
| 5,686,003 A | 11/1997 | Ingram et al. | |
| 5,752,672 A | 5/1998 | McKillip, Jr. | |
| 6,345,790 B1* | 2/2002 | Brix | B64C 23/076 244/46 |
| 6,578,798 B1* | 6/2003 | Dizdarevic | B64C 23/069 244/35 R |
| 7,306,187 B2 | 12/2007 | Lavan | |
| 7,503,527 B1 | 3/2009 | Fairchild | |
| 7,744,038 B2 | 6/2010 | Sankrithi et al. | |
| 7,878,459 B2 | 2/2011 | Mabe et al. | |
| 7,900,876 B2 | 3/2011 | Eberhardt | |
| 8,322,650 B2 | 12/2012 | Kelleher | |
| 8,439,313 B2 | 5/2013 | Rawdon et al. | |
| 8,534,611 B1 | 9/2013 | Pitt et al. | |
| 8,757,555 B2 | 6/2014 | Werthmann et al. | |
| 8,882,049 B2 | 11/2014 | Shams et al. | |
| 8,991,769 B2 | 3/2015 | Gandhi | |
| 9,555,895 B2 | 1/2017 | Vander Lind et al. | |
| 9,981,421 B2 | 5/2018 | Marcoe et al. | |
| 10,191,550 B1 | 1/2019 | Nussbaum et al. | |
| 10,336,412 B2 | 7/2019 | Morris | |
| 10,343,763 B2 | 7/2019 | Cross | |
| 10,625,847 B2 | 4/2020 | Dhandhania | |
| 10,773,487 B2 | 9/2020 | Frigerio et al. | |
| 10,933,974 B2 | 3/2021 | Tsuruta et al. | |
| 10,981,643 B2 | 4/2021 | Cross | |
| 11,254,412 B2 | 2/2022 | Dees et al. | |
| 11,279,469 B2 | 3/2022 | Petscher et al. | |
| 11,520,355 B2* | 12/2022 | Gupta | B64C 39/10 |
| 2003/0150957 A1 | 8/2003 | Thomas | |
| 2005/0121945 A1 | 6/2005 | Browne et al. | |
| 2006/0027703 A1 | 2/2006 | Bussom et al. | |
| 2006/0049307 A1 | 3/2006 | Schweiger | |
| 2009/0175726 A1 | 7/2009 | Rosati et al. | |
| 2009/0283643 A1 | 11/2009 | Sar et al. | |
| 2010/0000991 A1 | 1/2010 | Henry et al. | |
| 2010/0135806 A1 | 6/2010 | Benito | |
| 2011/0300358 A1 | 12/2011 | Blohowiak et al. | |
| 2012/0292155 A1 | 11/2012 | Gunter | |
| 2014/0331665 A1 | 11/2014 | Shivasgankara et al. | |
| 2015/0129715 A1 | 5/2015 | Madsen | |
| 2016/0176506 A1* | 6/2016 | Cross | F03D 1/0633 416/1 |
| 2016/0345088 A1 | 11/2016 | Vilermo et al. | |
| 2018/0105257 A1* | 4/2018 | Bernhardt | B64C 3/30 |
| 2018/0249772 A1 | 9/2018 | Koo et al. | |
| 2020/0164963 A1* | 5/2020 | da Silva | B33Y 80/00 |
| 2020/0172227 A1* | 6/2020 | Way | B64C 3/56 |
| 2021/0155338 A1 | 5/2021 | Vijgen et al. | |
| 2022/0276661 A1* | 9/2022 | Gupta | B64C 13/38 |
| 2022/0373095 A1 | 11/2022 | Panwar et al. | |

FOREIGN PATENT DOCUMENTS

| | | |
|---|---|---|
| EP | 1420094 B1 | 5/2005 |
| EP | 3206949 B1 | 8/2018 |
| JP | 2020103843 A | 7/2020 |
| WO | 2015150470 A1 | 10/2015 |
| WO | 2019186208 A1 | 10/2019 |

OTHER PUBLICATIONS

Bovesechhi et al, A Novel Self-Deployable Solar Sail System Activated by Shape Memory Alloys, Jul. 5, 2019 (Year: 2019).*
Boschetto et al, Shape Memory Activated Self-Deployable Solar Sails: Small-Scale Prototypes Manufacturing and Planarity Analysis by 3D Laser Scanner, May 3, 2019 (Year: 2019).*
Han et al, Shape memory alloy/glass fiber woven composite for soft morphing winglets of unmanned aerial vehicles, Jan. 2, 2016, Composite Structures, 140 (202-212) (Year: 2016).*
Costanza et al, Shape Memory Alloys for Aerospace, Recent Developments, and New Applications: A Short Review, Apr. 15, 2020 (Year: 2020).*
Bourdin et al., "Aircraft Control via Variable Cant-Angle Winglets", Journal of Aircraft, vol. 45, No. 2, Mar.-Apr. 2008 (10 pages).
Ameri et al., "Modelling the Dynamic Response of a Morphing Wing with Active Winglets", AIAA Atmospheric Flight Mechanics Conference and Exhibit, Aug. 20-23, 2007, Hilton Head, SC (19 pages).
Muller et al., "Design of Bio-Inspired Autonomous Aircraft for Bird Management", 16th Australian Aerospace Congress, Feb. 23-24, 2015, Melbourne, Australia (9 pages).
U.S. Appl. No. 17/186,251, filed Feb. 26, 2021.
Di Luca et al., "Bioinspired morphing wings for extended flight envelope and roll control of small drones", The Royal Society Publishing, 2016 (11 pages).
U.S. Appl. No. 17/721,793, filed Apr. 15, 2022.
Buckner, et al., "Roboticizing fabric by integrating functional fibers", Proceedings of the National Academy of Sciences (PNAS), vol. 117, No. 41, pp. 25360-25369, Oct. 13, 2020 (10 pages).
Buckner, et al., "Roboticizing fabric by integrating functional fibers", <http://movie-usa.glencoesoftware.com/video/10.1073/pnas.2006211117/video-4>.
U.S. Appl. No. 17/326,885, filed May 21, 2021.
Blain, "Refrigerants not required: Flexible metal cooling prototype demonstrates extreme efficiency", New Atlas, Mar. 13, 2019 <https://newatlas.com/shape-memory-alloy-nitinol-heating-cooling/58837/> (13 pages).

* cited by examiner

WINGLETS WITH PASSIVE AEROELASTIC TAILORING

FIELD

The subject matter described herein relates in general to aircraft and, more particularly, to the control of aircraft.

BACKGROUND

Aircraft can be exposed to highly variable environments. As a result, the aircraft may be subjected to changing aerodynamic requirements. Some aircraft have wings that can change shape and configuration to meet these changing requirements.

SUMMARY

In one respect, the present disclosure is directed to an aircraft. The aircraft can include a wing. The wing can include a tip. The aircraft can include a winglet pivotably connected to the wing proximate the tip. The aircraft can include a connecting member operatively connected to the wing and the winglet. The connecting member can include a flexible material and a super elastic material member operatively connected to the flexible material. Thus, the connecting member can allow passive movement of the winglet responsive to real-time operational forces acting upon the aircraft.

In another respect, the present disclosure is directed to a system. The system includes an aircraft. The aircraft includes a wing. The wing includes a first tip and a second tip. One or more first winglets can be pivotably connected to the wing proximate the first tip. The one or more first winglets can be independently movable from each other. One or more second winglets can be pivotably connected to the wing proximate the second tip. The one or more second winglets can be independently movable from each other. The one or more first winglets and the one or more second winglets can be independently movable from each other. The aircraft can include a plurality of connecting members. Each connecting member can be operatively connected to the wing and to a respective one of: the one or more first winglets or the one or more second winglets. Each connecting member can include a flexible material and a super elastic material member operatively connected to the flexible material. The super elastic material member can be configured to exhibit a stiffness profile. The stiffness profile can be non-linear and can include a region of quasi-zero stiffness. Thus, the connecting member can allow passive movement of the one or more first winglets and the one or more second winglets responsive to real-time operational forces acting upon the aircraft.

In still another respect, the present disclosure is directed to a method for an aircraft. The aircraft can include a wing. The wing can include a tip. The aircraft can include a winglet pivotably connected to the wing proximate the tip. The aircraft can include a connecting member operatively connected to the wing and the winglet. The connecting member can include a flexible material and a super elastic material member operatively connected to the flexible material. The super elastic material member can be configured to exhibit a stiffness profile. The stiffness profile can be non-linear and can including a region of quasi-zero stiffness. Thus, the connecting member allows passive movement of the winglet responsive to real-time operational forces acting upon the aircraft. The method can include selectively varying the stiffness profile of the super elastic material member by controlling a temperature of the super elastic material member.

DETAILED DESCRIPTION

Figure 1:
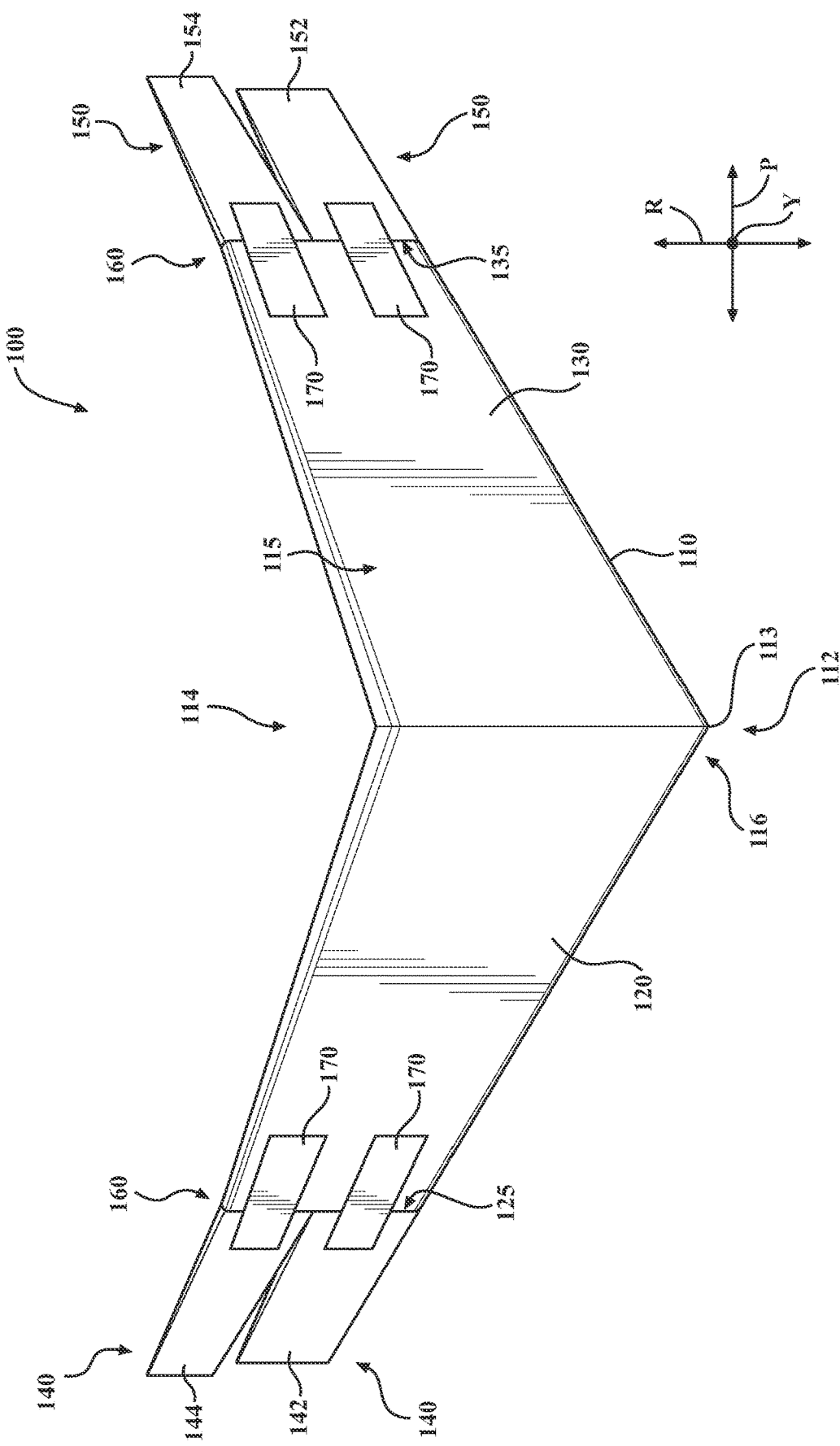
FIG. 1 is an example of an aircraft.

Due to the dynamic environments in which they operate, aircraft can be configured with adjustable portions to allow for enhanced control and improved operation of the aircraft. Some aircraft use servo motors to actuate the adjustable portions of the aircraft. Servo motors are relatively heavy and require programming to actuate.

According to arrangements described herein, passive aeroelastic tailoring can be provided for an aircraft. The aircraft can include a wing that extends to a tip. A winglet can be pivotably connected to the wing proximate the tip. A connecting member can be operatively connected to the wing and the winglet. The connecting member can include a flexible material and a super elastic material member operatively connected to the flexible material. Thus, the connecting member can allow passive movement of the winglet responsive to real-time operational forces acting upon the aircraft. Such arrangements can achieve gust load alleviation and stability, especially when the aircraft flies in high gust. Further, such arrangements can avoid the use of servo motors or active control.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-14, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an aircraft 100 is shown. The aircraft 100 can be any craft that is configured to fly or staying aloft in the air. In one or more arrangements, the aircraft 100 can be a kite. In one or more arrangements, the aircraft 100 can be a tailless aircraft. In one or more arrangements, the aircraft 100 can be a flying wing type aircraft.

The aircraft 100 can include a body 110. The body 110 can have any size, shape, and/or configuration. In the example shown, the body 110 can be generally V-shaped. The body 110 can be made of any suitable material, including, for example, fabric, metal, plastic, and/or wood. The aircraft 100 can have a front end 112 and a back end 114. The aircraft 100 can have an upper side 115 and a lower side 117. The terms "upper", "lower", "front", and "back" are used for convenience with respect to the relative position of the noted portion when the aircraft 100 is in its operational position.

The aircraft 100 can have a yaw axis Y, a pitch axis P, and a roll axis R. The yaw axis Y extends into and out of the page in FIG. 1. A nose 113 of the aircraft 100 can rotate right or left about the yaw axis Y. The pitch axis P extends in a left-right direction on the page in FIG. 1. The pitch axis P can generally extend transversely from wing to wing. The nose 113 of the aircraft 100 can rotate up and down about the pitch axis P. The roll axis R extends in a top-bottom direction on the page in FIG. 1. The roll axis R can generally extend from the front end 112 to the back end 114 of the aircraft 100. The aircraft 100 can rotate about the roll axis R. The aircraft 100 can rotate about one or more of these axes.

The body 110 can be at least partially hollow. Thus, the body 110 can have one or more inner chambers. The inner chamber(s) can be substantially sealed to retain a fluid therein. The inner chamber(s) can be substantially fluid impermeable.

In one or more arrangements, the body 110 can be configured to be inflatable. Thus, the body 110 can include one or more ports or valves to allow air or other fluid to be delivered to and/or released from one or more inner chambers of the body 110. The inner chamber can be operatively connected to a fluid source. In some arrangements, the fluid source can be configured to maintain a constant fluid pressure in the inner chamber. In some implementations, the fluid source can include a pump. In some arrangements, the fluid source can include a gas canister capable of delivering a compressed gas.

The body 110 can include a first wing 120 and a second wing 130. The first wing 120 can extend substantially laterally from a central body region 116 to a first tip 125. The second wing 130 can extend substantially laterally from the central body region 116 to a second tip 135. While described herein as the first wing 120 and a second wing 130, it will be appreciated that the aircraft 100 can have or can be a single, continuous wing overall. In such case, the first wing 120 can be a first wing portion of a wing, and the second wing 130 can be a second wing portion of the same wing. In some arrangements, a substantial majority of the body 110 can be defined by the first wing 120 and the second wing 130, as in a flying wing type of aircraft.

One or more first winglets 140 can be operatively connected to the first wing 120 at or proximate the first tip 125. In the example shown in FIG. 1, the first winglet(s) 140 can include a plurality of winglets. For instance, the first winglet(s) 140 can include a fore winglet 142 and an aft winglet 144. One or more second winglets 150 can be operatively connected to the second wing 130 at or proximate the second tip 135. In the example shown in FIG. 1, the second winglet(s) 150 can include a plurality of winglets. The terms "fore" and "aft" are used to note the relative position of the respective winglet when installed in their intended operational position. The fore winglets 142, 152 are located closer to the front end 112 of the aircraft 100 compared to the respective aft winglets 144, 154.

For convenience, the first winglet(s) 140 and the second winglet(s) 150 will be described herein as each having two winglets. However, it will be appreciated that arrangements herein are not limited to two winglets. Indeed, the first winglet(s) 140 and the second winglet(s) 150 can include more than two winglets. Moreover, quantity of the first winglet(s) 140 and the quantity of the second winglet(s) 150 can be the same, or they can be different.

The first winglet(s) 140 and the second winglet(s) 150 can be substantially identical to each other. The first winglet(s) 140 and the second winglet(s) 150 can be substantially mirror images of each other. The fore winglets 142, 152 and the aft winglets 144, 154 can have any suitable size, shape, and/or configuration. The fore winglets 142, 152 can be different than the aft winglets 144, 154. For instance, the fore winglets 142, 152 and the aft winglets 144, 154 can have different lengths, widths, and/or thickness. The fore winglets 142, 152 and the aft winglets 144, 154 can be made of any suitable material, including, for example, fabric, wood, metal, and/or plastic. The fore winglets 142, 152 can be substantially the same as each other, or the fore winglets 142, 152 can be different from each other in one or more respects. Similarly, the aft winglets 144, 154 can be substantially the same as each other, or the aft winglets 144, 154 can be different from each other in one or more respects.

The first winglet(s) 140 and the second winglet(s) 150 can be pivotably connected to a respective one of the first tip 125 and the second tip 135. The pivotable connection can be achieved in any suitable manner. For instance, the pivotable connection can be achieved using one or more hinges 160. The first winglet(s) 140 and the second winglet(s) 150 can generally be pivoted upwardly and downwardly relative to the body 110 or to a respective one of the first tip 125 and the second tip 135.

The first winglet(s) 140 and the second winglet(s) 150 be independently movable from each other. Further, when the first winglet(s) 140 include a plurality of winglets, the plurality of winglets can be independently movable from each other. As an example, the fore winglet 142 and the aft winglet 144 of the first winglet(s) 140 can be independently movable from each other. Still further, when the second winglet(s) 150 include a plurality of winglets, the plurality of winglets can be independently movable from each other. For instance, the fore winglet 152 and the aft winglet 154 of the second winglet(s) 150 can be independently movable from each other.

In some arrangements, the fore winglet 142 and the aft winglet 144 are not connected to each other. In some arrangements, the fore winglet 142 and the aft winglet 144 can be connected by a connecting element. For instance, the fore winglet 142 and the aft winglet 144 being connected by a webbing. The webbing can be made of any suitable material, such as, for example, fabric or plastic. The webbing can be operatively connected to the fore winglet 142 and the aft winglet 144 in any suitable manner, including, for example, by one or more fasteners, one or more adhesives, one or more forms of mechanical engagement, and any combination thereof. While the above description is directed to the webbing being used in connection with the first winglet(s) 140, it will be appreciated that, alternatively or additionally, the webbing can be used in connection with the second winglet(s) 150.

The aircraft 100 can include a plurality of connecting members 170. Each connecting member 170 can include a base 172 and a super elastic material member 174 (see, e.g., FIGS. 2A-2D). The base 172 can be made of any suitable material. For instance, in some arrangements, the base 172 can be made of a flexible, pliable, and/or compliant material. In one or more arrangements, the base 172 can be made of fabric, woven fabric, elastomer, plastic, shape-memory polymer (SMP), SMP composites, other pliable materials, or combinations thereof. In one or more arrangements, the base 172 can be made of a stitchable material, that is, a material that can be stitched and maintain integrity with stitches present in the material. In some arrangements, the base 172 can be made of one or more layers. In one or more arrangements, the base 172 can be made of a plurality of pieces of material.

The base 172 can have any suitable size, shape, and/or configuration. In one or more arrangements, the base 172 can be substantially rectangular in shape. However, in other arrangements, the base 172 can be substantially circular, substantially oval, substantially triangular, substantially polygonal, substantially trapezoidal, or other suitable shape.

The super elastic material member 174 can be operatively connected to the base 172. In some arrangements, a plurality of super elastic material members 174 can be operatively connected to the base 172. The super elastic material member 174 can be operatively connected to the base 172 in any suitable manner. For instance, in one or more arrangements, the super elastic material member 174 can be operatively connected to the base 172 by a plurality of stitches 175. The stitches 175 can affix the super elastic material member 174 to the base 172.

The stitches 175 can use one or more threads. Any suitable type of thread, now known or later developed, can be used. The threads can be blended, interwoven, and/or tightly wound. Further, the threads can be composed from a variety of materials, such as natural fibers, synthetic fibers, metals, shape memory material members, shape memory alloy, or other materials capable of being formed or woven into a thread, as well as combinations thereof. Thread can be stitched using any suitable type of stitch, now known or later developed.

In one or more arrangements, the super elastic material member 174 can be constrained on the base 172 in one or more areas. "Constrained on" includes being attached to the surface so as to keep the super elastic material member 174 substantially in contact with the base 172 when forces act upon the connecting member 170. Thus, in the areas in which the super elastic material member 174 is constrained on the base 172, the super elastic material member 174 can be restricted from separating from and/or moving away from the base 172. Such selective constraining can help to attain a desired movement of the connecting member 170. In some arrangements, the entire super elastic material member 174 can be constrained on the base 172.

In some arrangements, one or more portions of the super elastic material member 174 can be unconstrained. Unconstrained regions can be provided in regions where a joint and/or a shape change is desired. The super elastic material member 174 is not stitched to the base 172 in such regions. Thus, a stitching gap can be formed. In the unconstrained region, the super elastic material member 174 can be exposed on the base 172 and/or generally allowed free movement relative to the base 172.

In some arrangements, the super elastic material member 174 can be at least partially embedded within the base 172. For instance, the super elastic material member 174 can be woven into the base 172. The super elastic material member 174 can be located on one or both sides of the base 172.

The super elastic material member 174 can be made of any suitable super elastic material. One example of a super elastic material is AdrenaLine™, which is available from Miga Motor Company, Silverton, Oregon. Another example of a super elastic material is Furukawa Ni—Ti Alloy, which is available from Furukawa Techno Material Co., Ltd., Kanagawa, Japan. In other examples, the super elastic material member(s) can be a shape memory alloy.

The composition and percentage of constituent materials in the super elastic material member 174 can be various to achieve different characteristics and/or properties for the super elastic material member 174, such as elongation percentage, break load, transition temperature, fatigue, and stress. In some arrangements, the super elastic material member 174 nickel (Ni) and Titanium (Ti). The percentage of Ni and Ti in the super elastic material member 174 can be varied to achieve desired properties. In some arrangements, another material can be added to the super elastic material member 174. For instance, cobalt (Co) can be added, such as 1-2% of the total composition.

Figure 13:
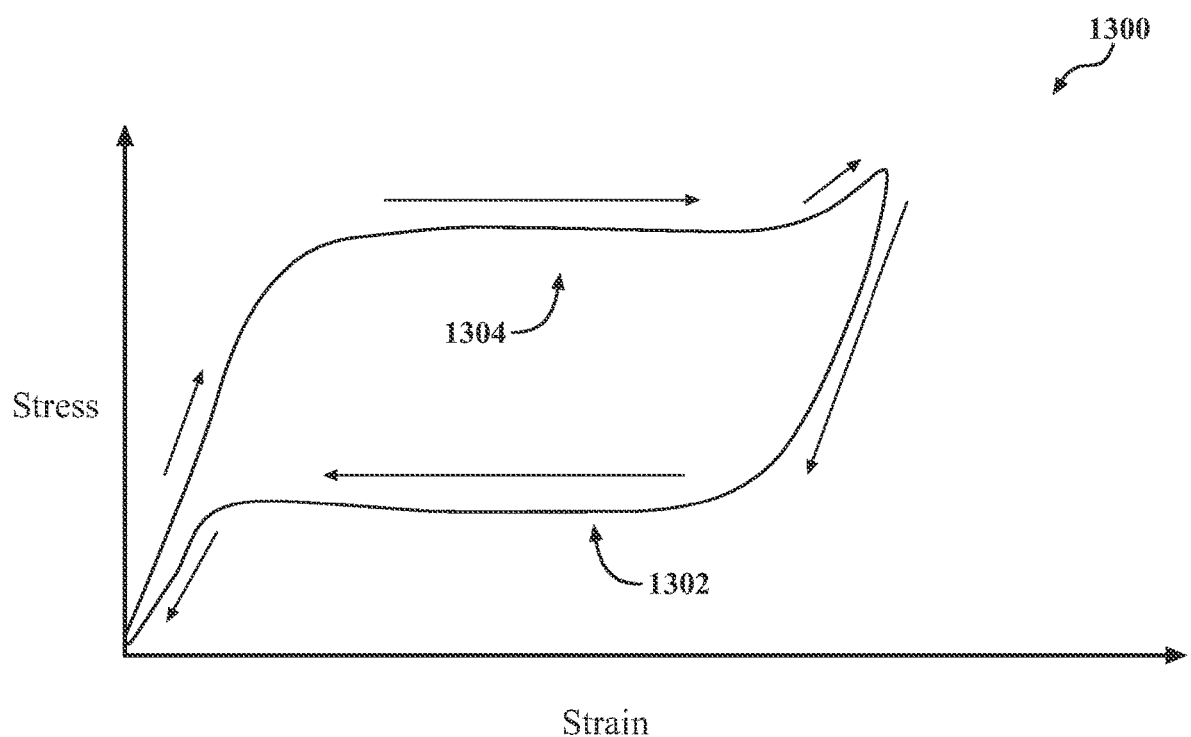
FIG. 13 is an example of a stress-strain curve for a super elastic material.

A super elastic material is a material that exhibits two primary properties under certain conditions: super elasticity and quasi-zero stiffness. These properties are depicted in an example of a stress-strain curve 1300 shown in FIG. 13. The stress-strain curve 1300 can defined a stiffness profile of the super elastic material member. As shown in FIG. 13, the stiffness profile, as a whole, is non-linear.

Super elasticity refers to the ability of the super elastic material to substantially regain its original shape when an applied stress, load, and/or force, is removed. For example, the super elastic recovery region 1302 of the stress-strain curve 1300 shows the super elastic material returning to a zero-stress state after unloading of an applied stress.

Quasi-zero stiffness refers to a region of the stress-strain curve 1300 for super elastic materials that is substantially flat. In the quasi-zero stiffness region 1304 of the stress-strain curve 1300, the stiffness becomes very low (for example, zero or substantially zero). There can be a quasi-zero stiffness region 1304 when the super elastic material is loaded and unloaded. When the super elastic material member(s) operate in the quasi-zero stiffness region 1304, the super elastic material member(s) can deform without increasing load.

The super elastic material member(s) would exhibit a similar profile on a force-deflection curve. In the quasi-zero stiffness region, the force-deflection curve can become substantially flat.

While the super elastic material members 174 can have any suitable form. In arrangements described herein, the super elastic material members 174 can be wires. In other arrangements, the super elastic material members 174 can take the form of cables, tubes, and/or other structures, just to name a few examples. Additionally or alternatively, the super elastic material members 174 may include an insulating coating.

The material of the super elastic material members 174 can be selected so that at least a certain percentage of expected operational loads will be handled by the super elastic material members 174. For example, the material of the super elastic material members 174 can be selected so that at least 80 percent of expected operational loads will be handled by the super elastic material members 174. More particularly, at least 80 percent of expected operational loads will cause the super elastic material members 174 to be stretched to a quasi-zero stiffness region of the stress-strain curve for the material. In some arrangements, the super elastic material members 174 can be pre-stretched so as to be in the quasi-zero stiffness region.

Figure 14:
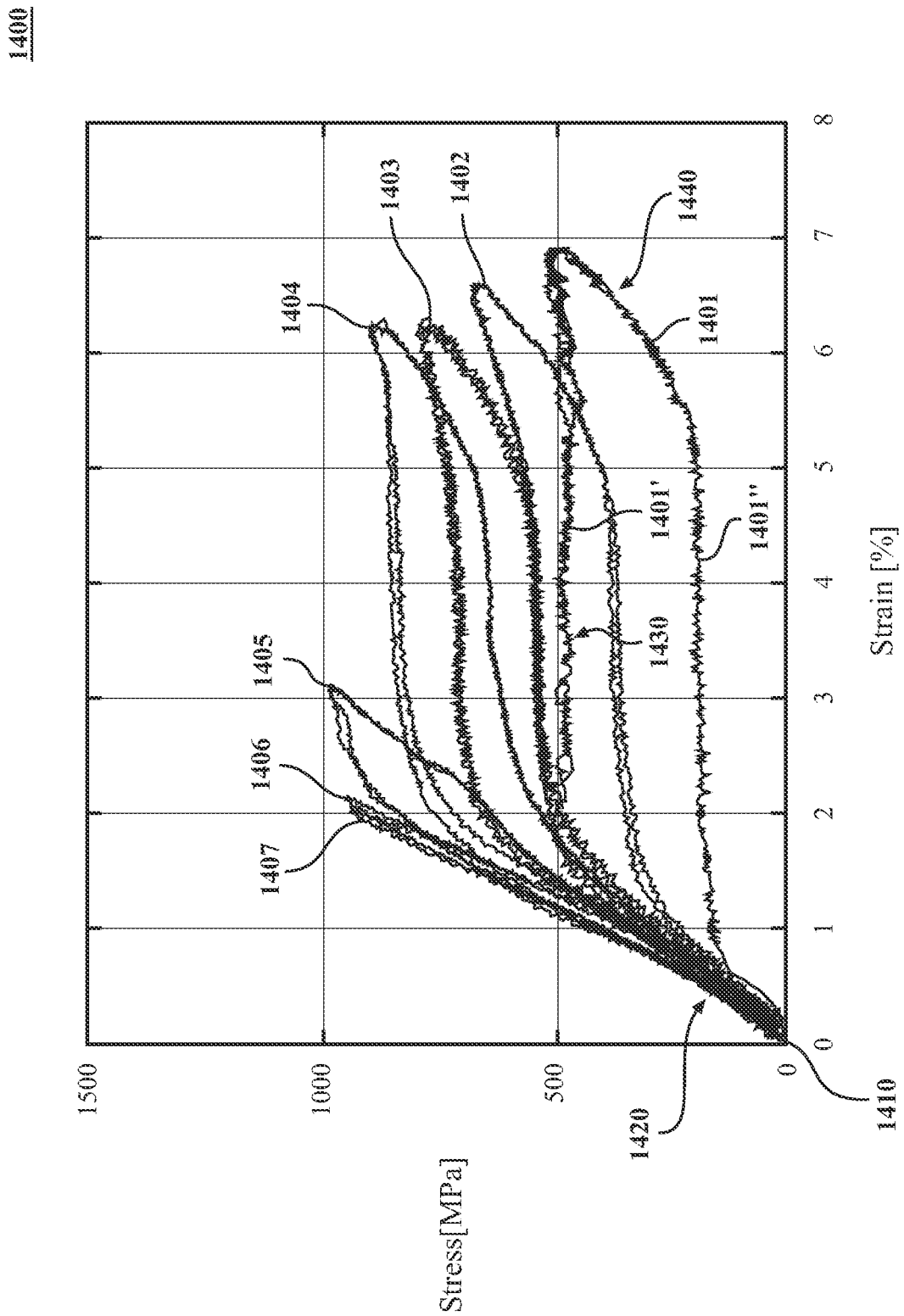
FIG. 14 is an example graph of stress-strain curves for a super elastic material member at different temperatures.

The stiffness of the super elastic material member 174 can be temperature dependent. As a result, the stiffness characteristics of the super elastic material member 174 can change with changes in temperature. Referring to FIG. 14, a graph 1400 showing example stress-strain curves for a super elastic material member (AdrenaLine™), at different temperatures is shown. In this example, stress-strain curves 1401, 1402, 1403, 1404, 1405, 1406, 1407 are shown for 23° C., 45° C., 71° C., 89° C., 103° C., 110° C., 129° C., respectively. It is noted that the graph 1400 is merely an example, as the values will vary depending on various characteristics of each particular super elastic material member.

The general shape of the stress-strain curves 1401, 1402, 1403, 1404, 1405, 1406, 1407 can represent the stiffness profile of the super elastic material member at different temperatures. As an example, the stress-strain curve 1401 will be described. Starting from the origin 1410, the super elastic material member can exhibit an initial stiffness region 1420 that is substantially linear. The super elastic material member can be relatively stiff in the initial stiffness region 1420. When load is reached, the stress-strain curve 1401 can become zero or substantially zero, which can be referred to as a quasi-zero stiffness region 1430. Continuing beyond the quasi-zero stiffness region 1430, the stress-strain curve 1401 can have a subsequent stiffness region 1440 that is substantially linear. The super elastic material member can be relatively stiff in the subsequent stiffness region 1140.

The stress-strain curve 1401 has a first portion 1401' and a second portion 1401". The first portion 1401' represents the super elastic material member going from a non-loaded state to a loaded state. A second portion 1401" represents the super elastic material member going from a loaded state to a non-loaded state.

It should be noted that, at each temperature, the super elastic material member can exhibit the quasi-zero stiffness region at a different stress level. Thus, an appropriate stiffness profile can be selected for the super elastic material member based on real-time loading conditions.

Further, it is noted that, at some temperature levels, the stiffness characteristics of the super elastic material member may not be as desirable because the quasi-zero stiffness region may be lost. As an example, the stress-strain curves 1405, 1406, 1407 do not include a quasi-zero stiffness region. Thus, for the example super elastic material member shown in FIG. 14, it may not be desirable to heat the super elastic material member beyond 89° C.

Various examples of the connecting member 170 are shown in FIGS. 2A-2D. In some arrangements, the connecting member 170 can be configured such that, when forces (e.g., an upward or a downward force) are applied to the connecting member 170, the connecting member 170 can deform in a desired motion. It will be appreciated that the super elastic material member 174 can be arranged on the base 172 to achieve a desired deformation motion for the connecting member 170. Various non-limiting examples of patterns in which the super elastic material member 174 can be arranged are shown in FIGS. 2A-2D.

Figure 2A:
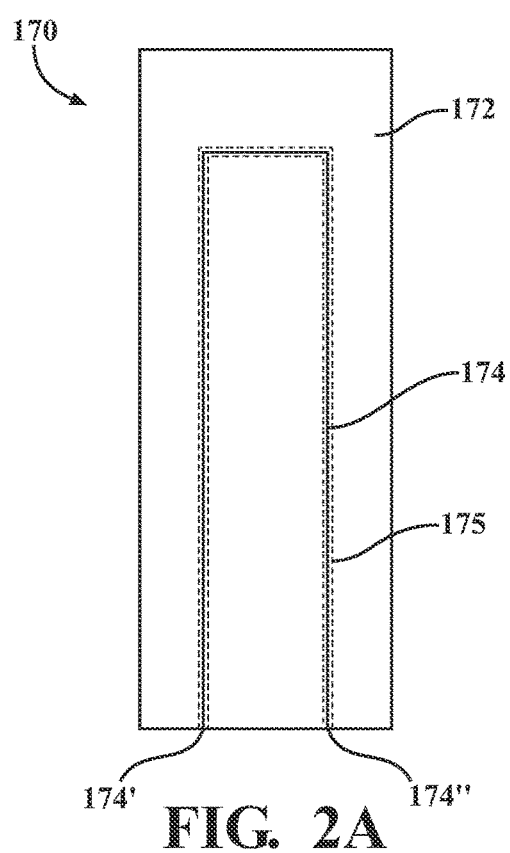
FIG. 2A shows an example of a connecting member with a super elastic material arranged in a first pattern.

In some arrangements, the connecting member 170 can be configured to bend, curl, or curve when the connecting member 170 is subjected to forces (e.g., upward or downward operational forces). The bending, curling, or curving can be upward or downward. FIG. 2A shows one example of the connecting member 170 being configured for such movement when activated. As can be seen, the super elastic material member 174 can be arranged in a substantially U-shaped pattern on the base 172. In this arrangement, a first end 174' and a second end 174" of the super elastic material member 174 can be located on the same side of the connecting member 170.

Figure 2B:
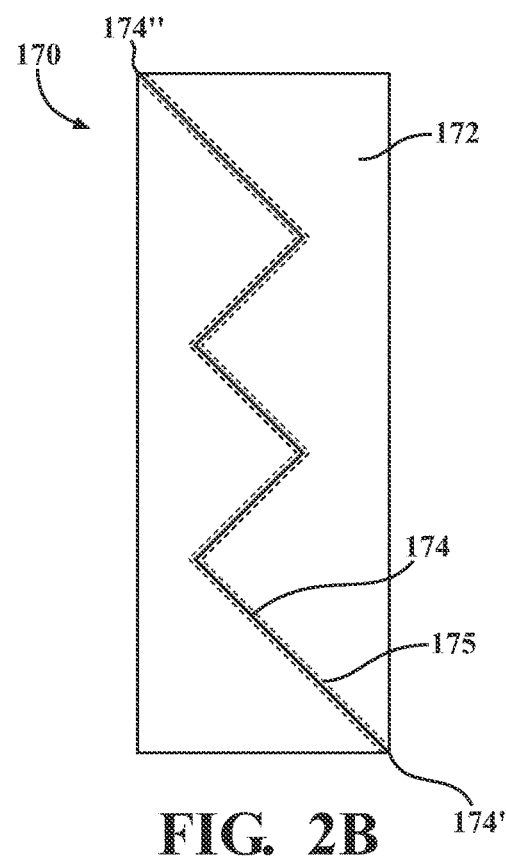
FIG. 2B shows an example of a connecting member with a super elastic material arranged in a second pattern.
Figure 2C:
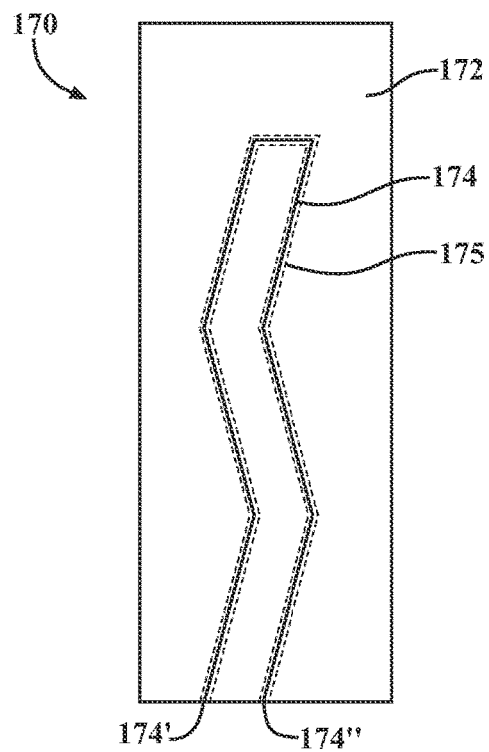
FIG. 2C shows an example of a connecting member with a super elastic material arranged in a third pattern.
Figure 2D:
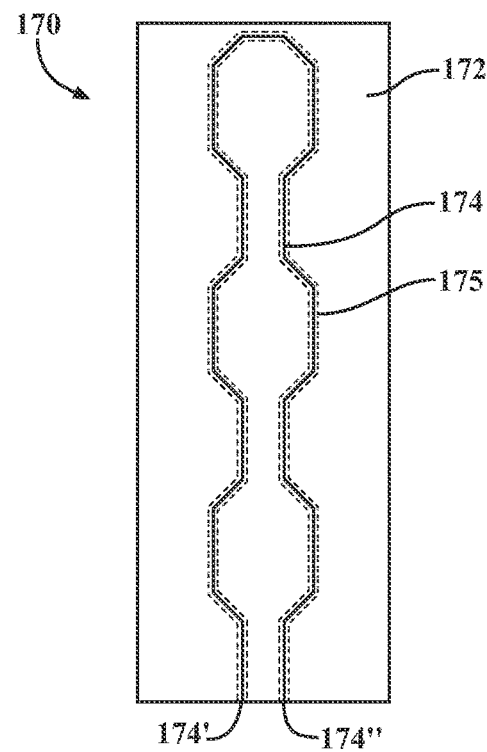
FIG. 2D shows an example of a connecting member with a super elastic material arranged in a fourth pattern.

In other arrangements, the connecting member 170 can be configured to bend, curl, or curve in a plurality of directions when the connecting member 170 is activated. As an example, one direction of bending, curling, or curving can be about the roll axis R, and another direction of bending, curling, or curving can be generally in a direction that is transverse to the roll axis R (e.g., the pitch axis P or the yaw axis Y). As another example, the connecting member 170 can bend, curl, or curve about a first axis that extends into and out of the page in FIG. 6. The connecting member 170 can also bend, curl, or curve about a second axis that extends in the left-right direction of the page in FIG. 6. Thus, there can be a twisting motion of the connecting member 170. FIGS. 2B-2D show examples of the connecting member 170 being configured for such movement when activated.

Referring to FIG. 2B, the super elastic material member 174 can be arranged in a single zig-zag pattern. In this arrangement, the first end 174' and the second end 174" of the super elastic material member 174 can be located on opposite sides of the connecting member 170. Referring to FIG. 2C, the super elastic material member 174 can double back so as to form a double zig-zag pattern. In this arrangement, the first end 174' and the second end 174" of the super elastic material member 174 can be located on the same side of the connecting member 170. FIG. 2D shows the super elastic material member 174 arranged to double back in an undulating pattern. Here, the first end 174' and the second end 174" of the super elastic material member 174 can be located on the same side of the connecting member 170.

FIGS. 2A-2D are merely a few examples of different arrangements of the super elastic material member 174. It will be appreciated that these arrangements are merely examples and are not intended to be limiting. Of course, the super elastic material member 174 can be arranged in any suitable manner to provide a desired deformation of the connecting member 170 when subjected to operational loads.

Each of the connecting members 170 can be operatively connected to one of the wings 120, 130 and a respective one of the winglets 140, 150. Any suitable form of operative connection can be provided, including, for example, one or more fasteners, one or more adhesives, one or more forms of mechanical engagement, one or more stitches, one or more other forms of connection, and/or any combination thereof.

The connecting members 170 can be attached to the respective structures in one or more regions of the connecting members 170. As an example, the connecting member 170 can be operatively connected to the first wing 120 or the second wing 130 at in a first end region 176 or at a first end 177 of the connecting member 170. The connecting member 170 can be operatively connected to a respective one of the first winglet(s) 140 and the second winglet(s) 150 in a second end region 178 or at a second end 179 thereof. The first end 177 can be opposite to the second end 179.

Figure 4:
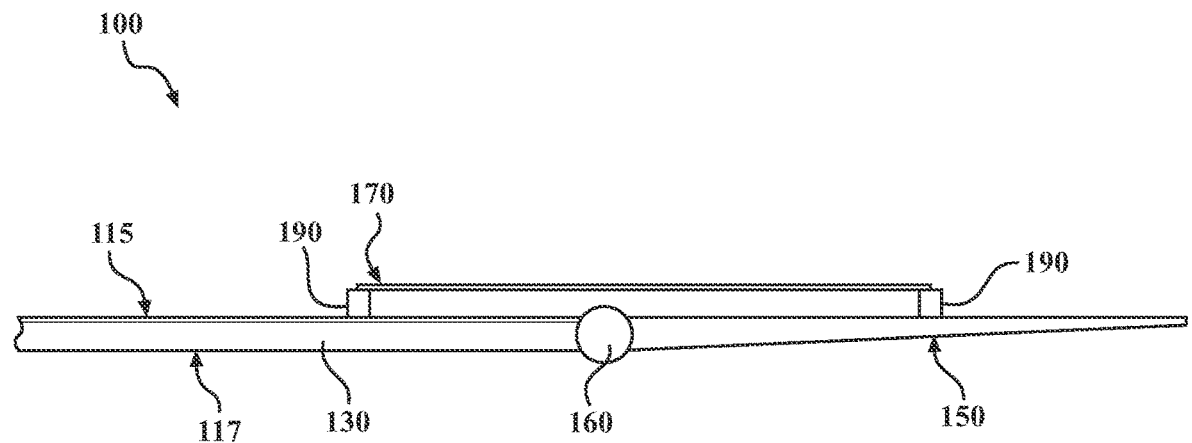
FIG. 4 is an example of an arrangement in which a connecting member operatively connected to a top side of a wing and a top side of a winglet.
Figure 5:
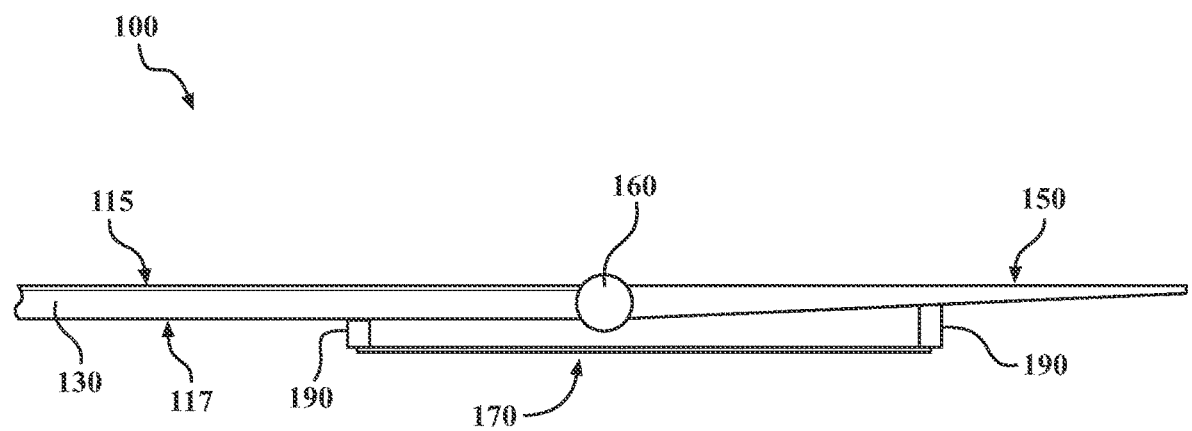
FIG. 5 is an example of an arrangement in which a connecting member operatively connected to a bottom side of a wing and a bottom side of a winglet.
Figure 6:
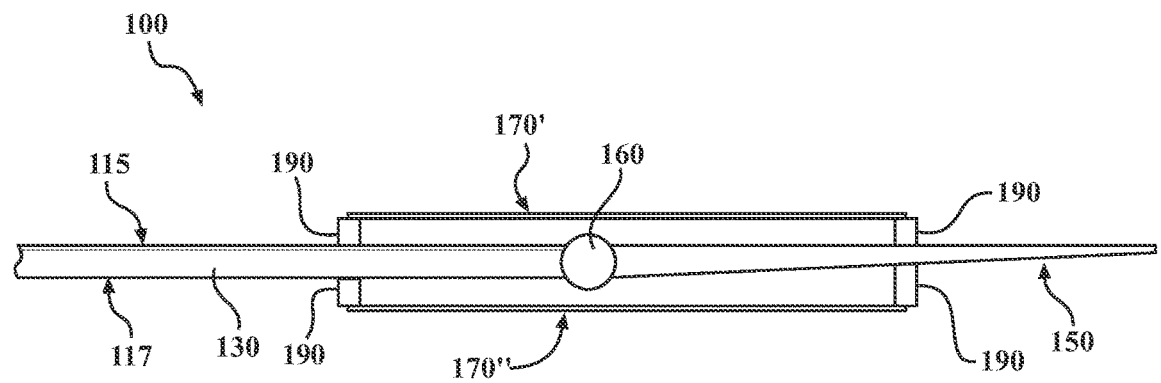
FIG. 6 is an example of an arrangement in which a first connecting member operatively connected to a top side of a wing and a top side of a winglet and a second connecting member operatively connected to a bottom side of the wing and a bottom side of the winglet.

The connecting members 170 can be attached on the upper side 115 of the aircraft 100 and/or on the lower side 117 of the aircraft 100. FIGS. 4-6 show various examples of these arrangements. Referring to FIG. 4, the connecting member 170 can be attached to the second wing 130 and one of the second winglets 150 on the upper side 115 of the aircraft 100. FIG. 5 shows an example in which the connecting member 170 can be attached to the second wing 130 and one of the second winglets 150 on the lower side 117 of the aircraft 100. FIG. 6 shows an example in which a first connecting member 170' can be attached to the second wing 130 and one of the second winglets 150 on the upper side 115 of the aircraft, and a second connecting member 170" can be attached to the second wing 130 and one of the second winglets 150 on the lower side 117 of the aircraft 100. It will be appreciated that, while FIGS. 4-6 are described with respect to the second wing 130 and the second winglet(s) 150, the arrangements shown apply to the first wing 120 and the first winglet(s) 140 as well. Further, FIGS. 4-6 show the connecting member 170 being spaced from the second wing 130 and the second winglets 150 by posts 190. However, in some arrangements, the connecting members can be directly in contact with the second wing 130 and/or the second winglets 150.

Further, the arrangements between the connecting members 170 and the first wing 120 and the arrangements between the connecting members 170 and the second wing 130 can be the same, or they can be different. For example, the arrangements between the connecting members 170 and the first wing 120 can be similar to any one of FIGS. 4-6, and the arrangements between the connecting members 170 and the second wing 130 can be a different one of FIGS. 4-6.

Figure 7:
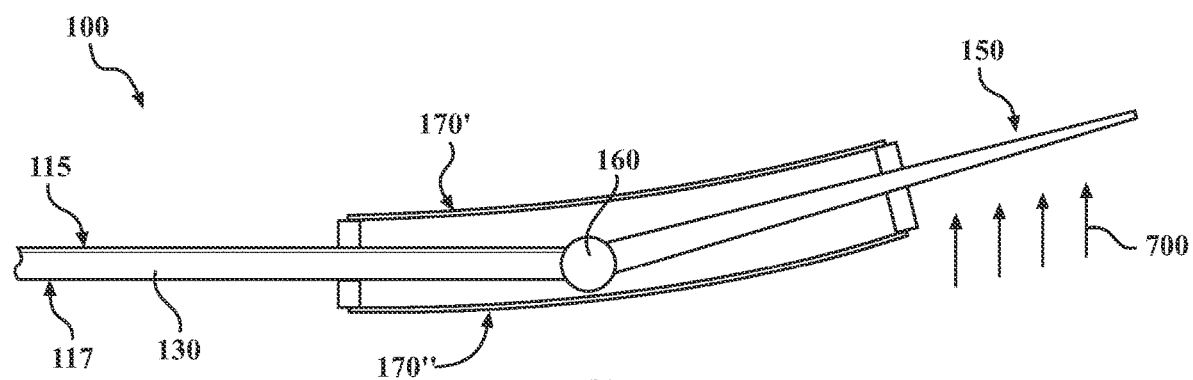
FIG. 7 shows an example of passive movement of the winglet in response to upward operational forces acting upon the aircraft.
Figure 8:
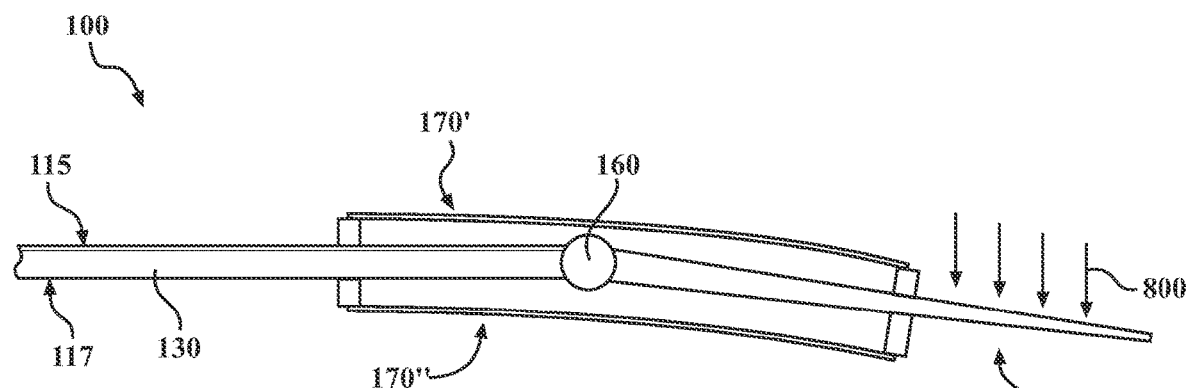
FIG. 8 shows an example of passive movement of the winglet in response to downward operational forces acting upon the aircraft.
Figure 9:
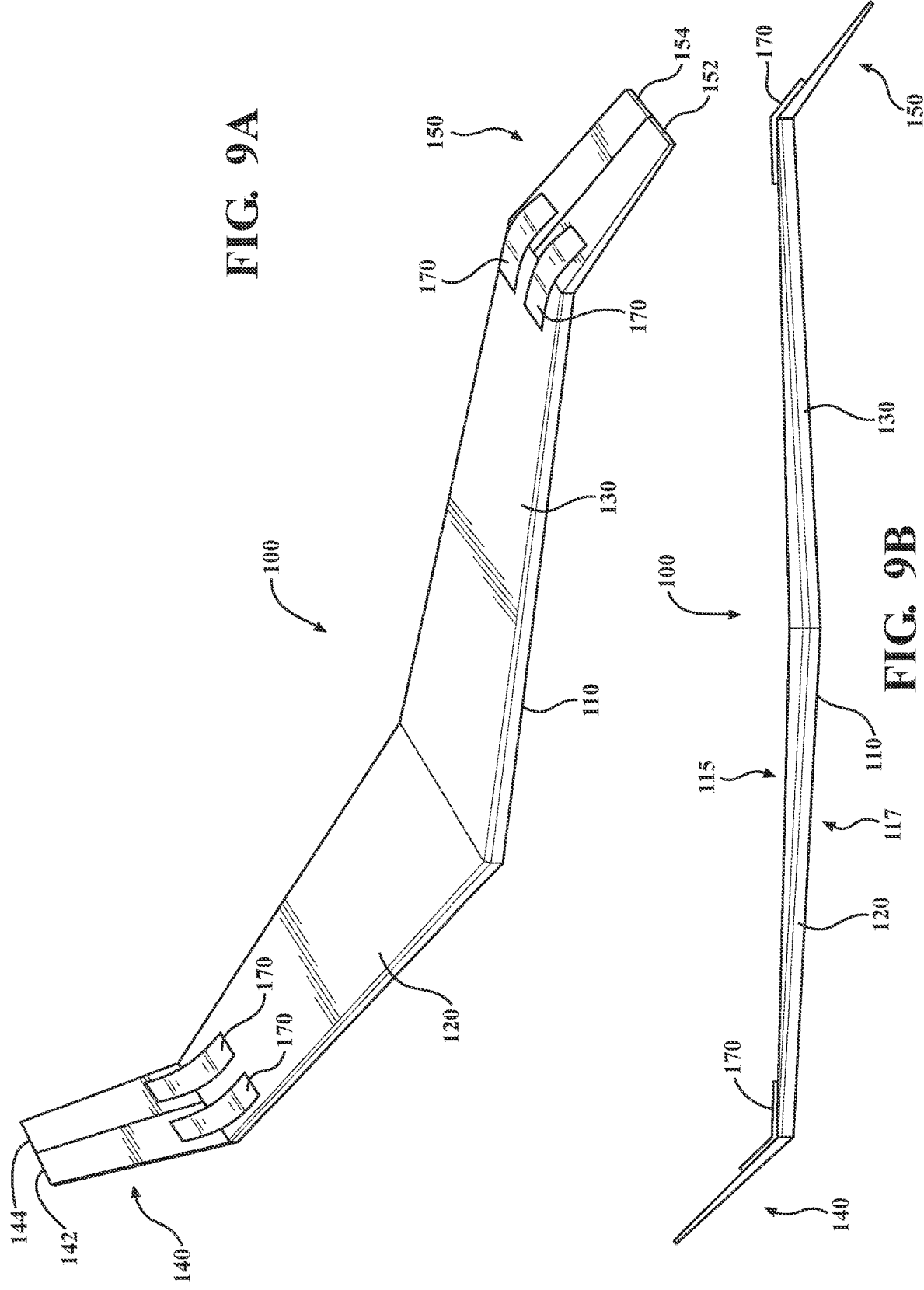
FIGS. 9A-9B are views of the aircraft, showing different operational forces acting on a first wing tip and a second wing tip.
Figure 10:
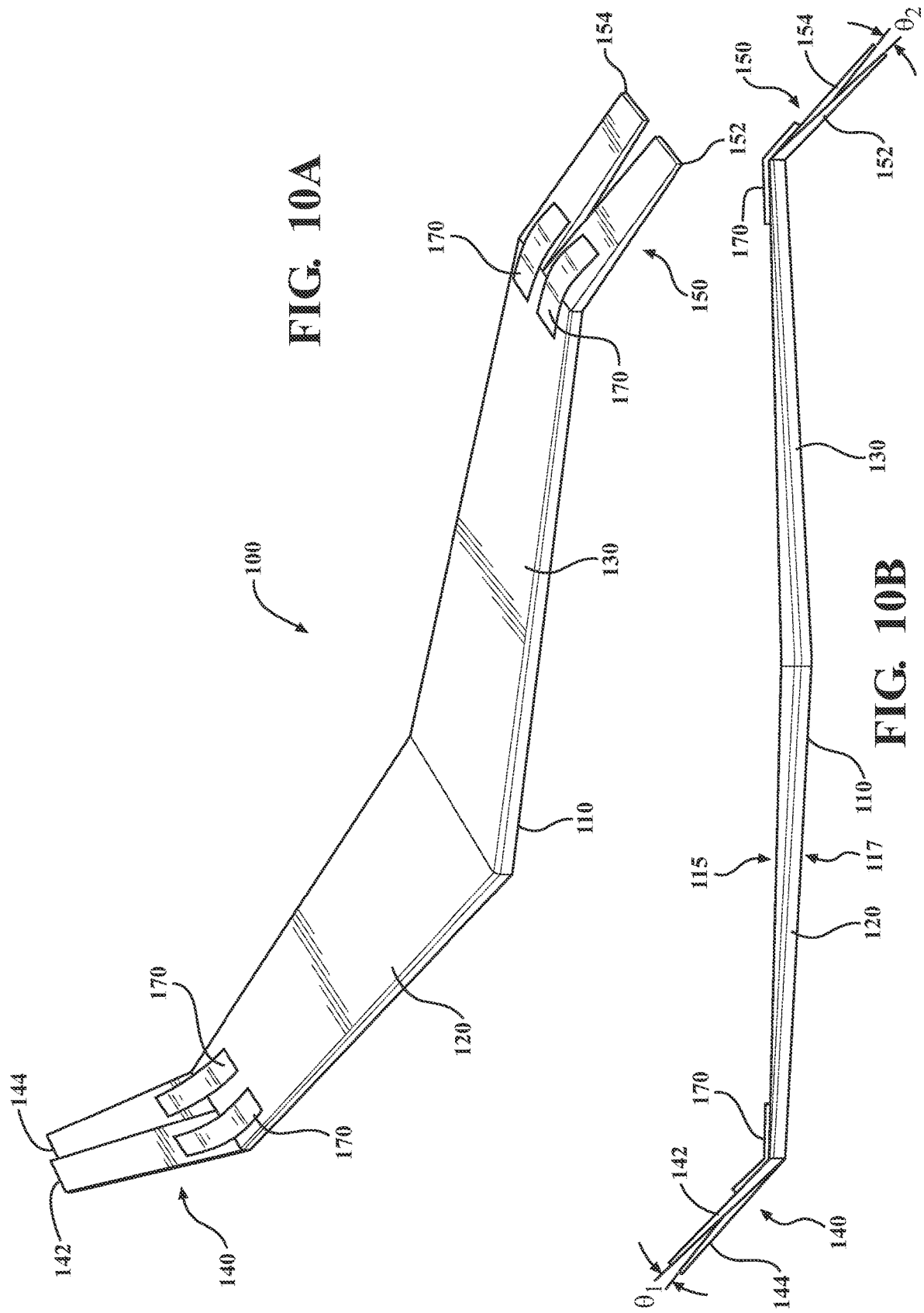
FIGS. 10A-10B are views of the aircraft, showing different operational forces acting on a first wing tip and a second wing tip and different operational forces acting on each winglet at the first wing tip and the second wing tip.
Figure 11:
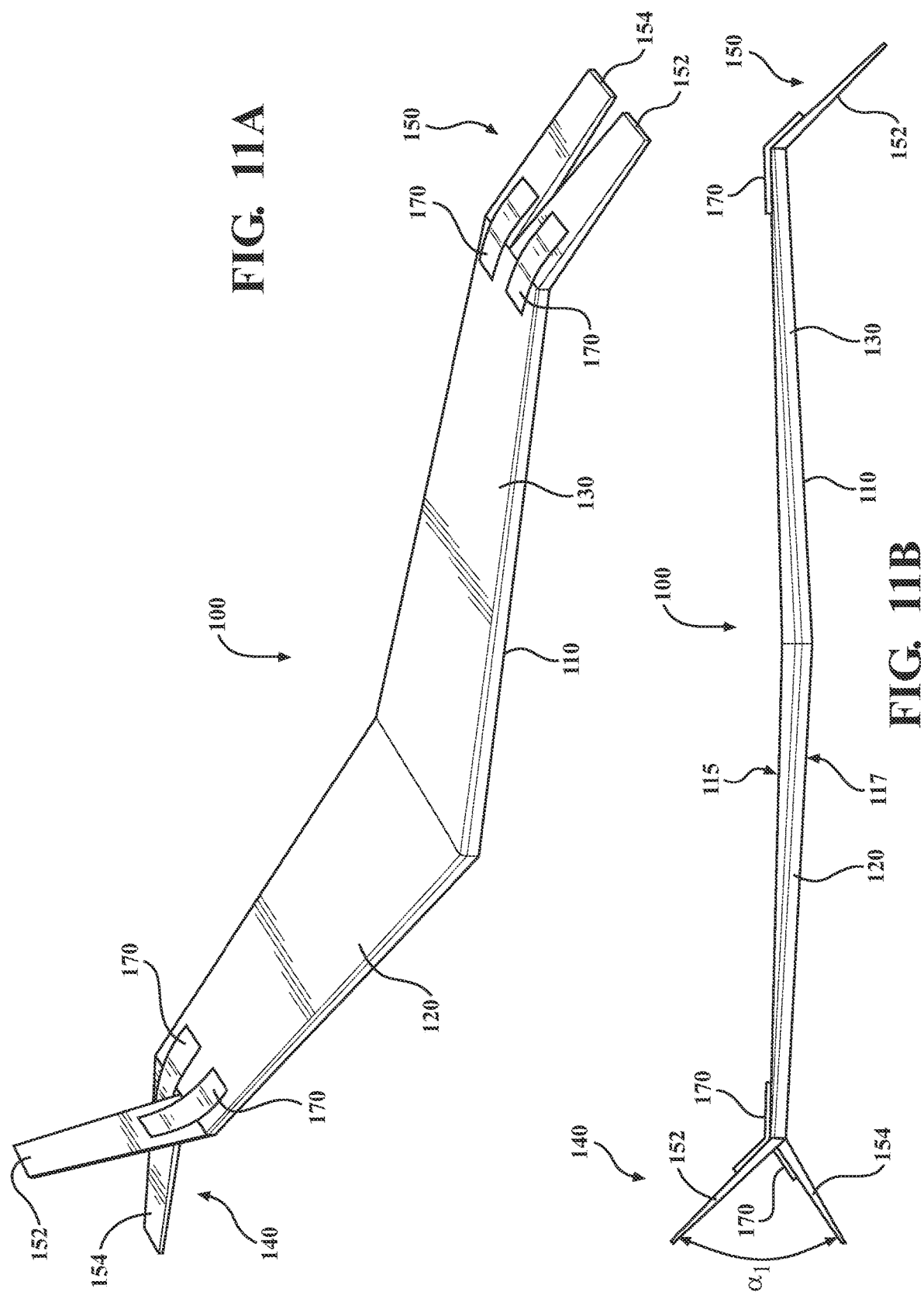
FIGS. 11A-11B are views of the aircraft, showing different operational forces acting on a first wing tip and a second wing tip and different operational forces acting on each winglet at the first wing tip.

It will be appreciated that the connecting member 170 can allows passive movement of the winglets responsive to real-time operational forces acting upon the aircraft 100. FIG. 7 shows an example of passive movement of one of the second winglets 150 in response to upward operational forces 700 acting upon the aircraft 100. FIG. 8 shows an example of passive movement of one of the second winglets 150 in response to downward operational forces 800 acting upon the aircraft 100. In both FIGS. 7 and 8, the second winglet 150 can bend in response to the operational forces 700, 800. The movement of the second winglet 150 can also be facilitated by the hinge(s) 160.

Figure 3:
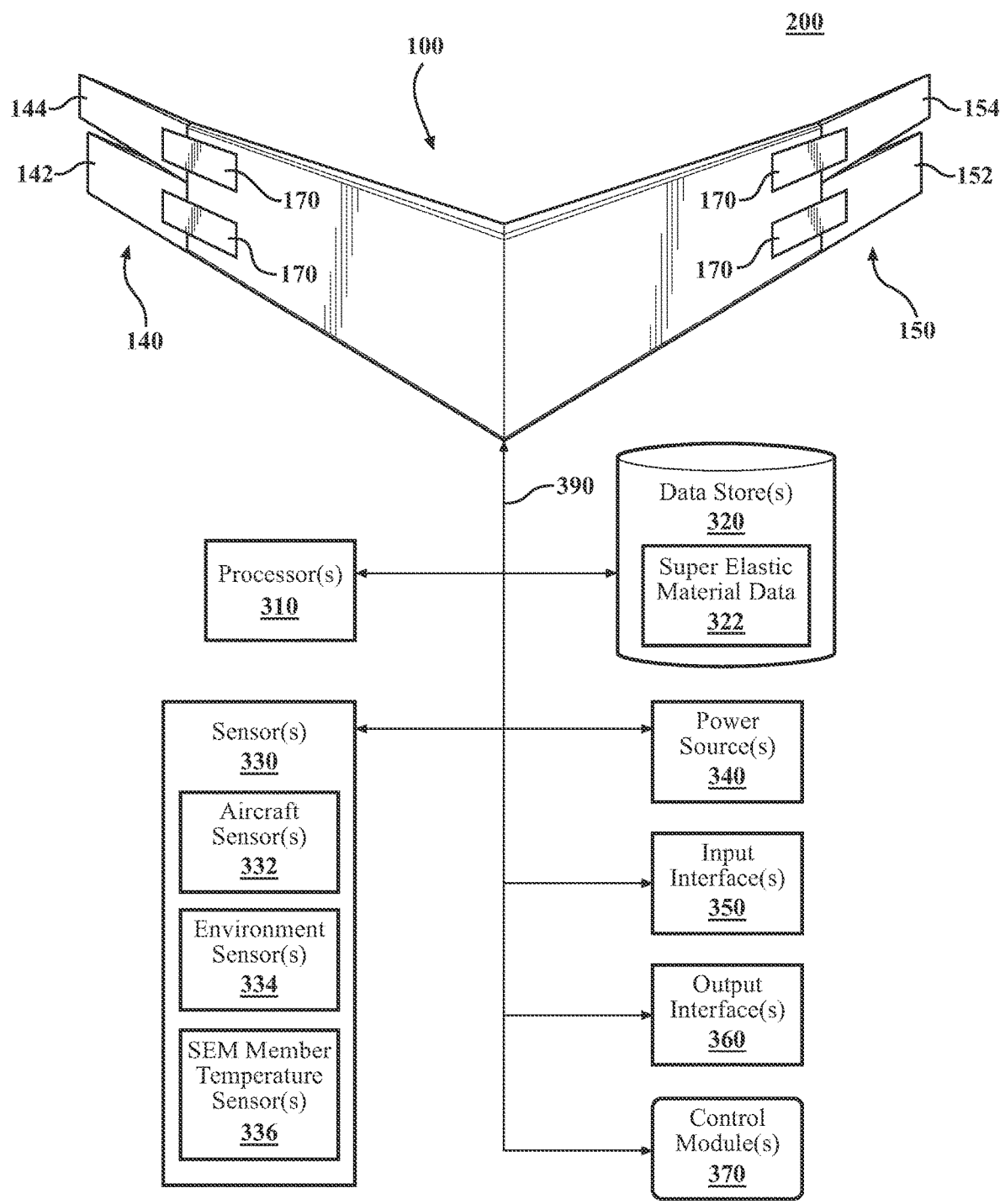
FIG. 3 is an example of an aircraft system.

Referring to FIG. 3, an example of a system 300. The system 300 can include various elements. Some of the possible elements of the system 300 are shown in FIG. 3 and will now be described. It will be understood that it is not necessary for the system 300 to have all of the elements shown in FIG. 3 or described herein. The system 300 can have any combination of the various elements shown in FIG. 3. Further, the system 300 can have additional elements to those shown in FIG. 3. In some arrangements, the system 300 may not include one or more of the elements shown in FIG. 3. Further, various elements may be located on or within the aircraft 100, but it will be understood that one or more of these elements can be located external to the aircraft 100. Thus, such elements are not located on, within, or otherwise carried by the aircraft 100. Further, the elements shown may be physically separated by large distances. Indeed, one or more of the elements can be located remote from the other elements of the system 300.

The system 300 can include the aircraft 100, one or more processors 310, one or more data stores 320, one or more sensors 330, one or more power sources 340, one or more input interfaces 350, one or more output interfaces 360, and/or one or more control modules 370. Each of these elements will be described in turn below.

As noted above, the system 300 can include one or more processors 310. "Processor" means any component or group of components that are configured to execute any of the processes described herein or any form of instructions to carry out such processes or cause such processes to be performed. The processor(s) 310 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 310 can include at least one hardware circuit (e.g., an integrated circuit) configured to carry out instructions contained in program code. In arrangements in which there is a plurality of processors 310, such processors can work independently from each other, or one or more processors can work in combination with each other.

The system 300 can include one or more data stores 320 for storing one or more types of data. The data store(s) 320 can include volatile and/or non-volatile memory. Examples of suitable data stores 320 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 can be a component of the processor(s) 310, or the data store(s) 320 can be operatively connected to the processor(s) 310 for use thereby. The term "operatively connected," as used throughout this description, can include direct or indirect connections, including connections without direct physical contact.

In some arrangements, the data store(s) 320 can store super elastic material data 322 about one or more super elastic material members, including the super elastic material member(s) 174. As an example, the data store(s) 320 can store stress-strain curves and/or force-deflection curves for one or more super elastic material members, such as any of those used in the connecting members 170. For each super elastic material member, the stress-strain curves and/or the force-deflection curves can show the performance of the respective super elastic material member at different temperatures.

The system 300 can include one or more sensors 330. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process. The sensor(s) 330 can be operatively connected to the processor(s) 310, the data store(s) 320, and/or other elements of the system 300 (including any of the elements shown in FIG. 3).

The sensor(s) 330 can include any suitable type of sensor. The sensor(s) 330 can be configured to acquire sensor data about the aircraft and/or about an external environment of the aircraft. Various examples of sensors will be described herein. However, it will be understood that the embodiments are not limited to the particular sensors described. One or more of the sensors(s) 330 can be located onboard the aircraft 100.

The sensor(s) 330 can include one or more aircraft sensors 332. The aircraft sensor(s) 332 can be configured to acquire, detect, determine, assess, monitor, measure, quantify and/or sense aircraft data. "Aircraft data" includes data or information about the aircraft 100 itself or any system, device, component or portion thereof. Aircraft data or information can include, for example, roll, yaw, pitch, position, orientation, speed, weight, temperature, pressure, stress, and/or strain, just to name a few possibilities. In one or more arrangements, the aircraft sensor(s) 332 can include an inertial measurement unit (IMU). Additional examples of the aircraft sensor(s) 332 can include one or more speedometers, weight sensors, pressure sensors, position and/or displacement sensors, level sensors, force sensors, torque sensors, gyroscopes, accelerometers, a dead-reckoning system, a global navigation satellite system (GNSS), a global positioning system (GPS), radio compass (NDB), altitude sensors, attitude sensors, Angle-of-Attack (AoA) sensors, altimeters, and/or other suitable sensors. The aircraft sensor(s) 332 can be any type of sensor, now known or later developed.

The sensor(s) 330 can include one or more environment sensors 334. The environment sensor(s) 334 can be configured to acquire, detect, determine, assess, monitor, measure, quantify, acquire, and/or sense environment data. "Environment data" includes data or information about the external environment in which the aircraft 100 is located. For instance, the environment sensor(s) 334 can include one or more wind speed sensors and/or one or more wind angle sensors. In one or more arrangements, the environment sensor(s) 334 can include one or more cameras, one or more radar sensors, one or more lidar sensors, one or more sonar sensors, and/or one or more ranging sensors. In one or more arrangements, the environment sensor(s) 334 can include one or more temperature sensors, pressure sensors, proximity sensors, flow sensors, and/or others. In one or more arrangements, the environment sensor(s) 334 can be configured to detect atmospheric phenomena that may affect the stability of the aircraft 100, such as turbulence, changes in barometric pressure, wind gusts, just to name a few possibilities. In one or more arrangements, the environment sensor(s) 334 can be configured to detect objects in the external environment. In one or more arrangements, the environment sensor(s) 334 can include one or more pitot tubes. The environment sensor(s) 334 can include any type of sensor, now known or later developed.

The sensor(s) 330 can include one or more super elastic material member temperature sensors 336. The super elastic material member temperature sensor(s) 336 can be any sensor configured to detect, determine, assess, monitor, measure, quantify and/or sense the temperature of a super elastic material member, now known or later developed.

As noted above, the system 300 can include one or more power sources 340. For example, the power source(s) 340 can include one or more batteries, one or more fuel cells, one or more generators, one or more alternators, one or more solar cells, and combinations thereof. The power source(s) 340 can be any power source capable of and/or configured to supply energy to the super elastic material member(s) 174. The power source(s) 340 can be a source of electrical energy.

The system 300 can include one or more input interfaces 350. An "input interface" includes any device, component, system, element or arrangement or groups thereof that enable information/data to be entered into a machine. The input interface(s) 350 can receive an input from any source, such as a remote operator of the aircraft 100. Any suitable input interface 350 can be used, including, for example, a keypad, display, touch screen, multi-touch screen, button, joystick, mouse, trackball, microphone, gesture recognition (radar, lidar, camera, or ultrasound-based), and/or combinations thereof.

The system 300 can include one or more output interfaces 360. An "output interface" includes any device, component, system, element or arrangement or groups thereof that enable information/data to be presented to a user (e.g., a person) or other entity. The output interface(s) 360 can present information/data to a user or other entity. The output interface(s) 360 can include a display, an earphone, haptic device, and/or speaker. Some components of the system 300 may serve as both a component of the input interface(s) 350 and a component of the output interface(s) 360. In one or more arrangements, the input interface(s) 350 and/or the output interface(s) 360 can be provided remote from the aircraft 100, such as on a remote-control device, unit, or system, which can be operated by a remote human operator.

The system 300 can include one or more modules. The modules can be implemented as computer readable program code that, when executed by a processor, implement one or more of the various processes described herein. One or more of the modules can be a component of the processor(s) 310, or one or more of the modules can be executed on and/or distributed among other processing systems to which the processor(s) 310 is operatively connected. The modules can include instructions (e.g., program logic) executable by one or more processor(s) 310. Alternatively or in addition, one or more data stores 320 may contain such instructions.

The system 300 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 300 can include one or more control modules 370. The control module(s) 370 can include profiles and logic for actively controlling the aircraft 100 and/or a temperature of the super elastic material members 174 according to arrangements herein. The control module(s) 270 can be configured to, autonomously or in response to a remote command, cause the temperature of the super elastic material members 174 to be adjusted based on real-time operational conditions of the aircraft 100.

The control module(s) 370 can be configured to do so in any suitable manner. For instance, the control module(s) 370 can be configured to analyze data or information acquired by the sensor(s) 330 (e.g., the aircraft sensor(s) 332, the environment sensor(s) 334, and/or the super elastic material member temperature sensor(s) 336). Alternatively or additionally, the control module(s) 370 can be configured to detect user inputs (e.g., commands) provided on the input interface(s) 350. The control module(s) 370 can retrieve raw data from the sensor(s) 330 and/or from the data store(s) 320. The control module(s) 370 can use profiles, parameters, or setting loaded into the control module(s) 370 and/or stored in the data store(s) 320.

The control module(s) 370 can analyze sensor data acquired by the sensor(s) 330 to determine an appropriate action for the super elastic material members 174. The control module(s) 270 can detect forces (e.g., aerodynamic forces) affecting the aircraft 100. The control module(s) 270 can detect wind speeds and wind angles. The control module(s) 270 can detect roll, yaw, and/or pitch moments acting upon the aircraft 100.

Based on real-time conditions, the control module(s) 370 can be configured to cause the stiffness profile of one or more of the super elastic material members 174 of the connecting members 170 to be adjusted. As used herein, "cause" or "causing" means to make, force, compel, direct, command, instruct, and/or enable an event or action to occur or at least be in a state where such event or action may occur, either in a direct or indirect manner. For instance, the control module(s) 37 can cause the super elastic material members 174 to be selectively heated or cooled.

As noted above, the stiffness of the super elastic material members 174 is temperature dependent. The super elastic material members 174 can be heated or cooled in any suitable manner, now known or later developed. For instance, the super elastic material members 174 can be heated by the Joule effect by passing electrical current through the super elastic material members 174. To that end, the control module(s) 370 can be configured to selectively permit, restrict, adjust, alter, and/or prevent the flow of electrical energy from the power source(s) 340 to one or more of the super elastic material members 174. The control module(s) 370 can be configured to send control signals or commands over a communication network 390 to the super elastic material members 174 or to other elements of the system 300.

The control module(s) 370 can be configured to cause the stiffness characteristics of the super elastic material members 174 associated with the connecting members 170 to be adjusted based on one or more parameters. For instance, the control module(s) 370 can be configured to cause the stiffness characteristics of the super elastic material members 174 associated with the connecting members 170 to be adjusted based on real-time conditions as detected by the sensor(s) 330. Based on these real-time conditions, the control module(s) 370 can determine suitable stiffness characteristics for the super elastic material members 174. The control module(s) 370 can query the data store(s) 320 for data about the super elastic material member(s) 174. For instance, the control module(s) 370 can query the super elastic material data 322, such as the stress-strain curves for the super elastic material member(s) 174. The control module(s) 370 can be configured to select or determine a target temperature for the super elastic material members 174 to achieve desired stiffness characteristic(s). The target temperature can be based on one of the stress-strain curves, or it can be interpolated using the two stress-strain curves that bracket the desired stiffness characteristic(s).

Once a target temperature is selected, the control module(s) 370 can compare a current temperature of the super elastic material members 174, as determined by the super elastic material member temperature sensor(s) 336, to the target temperature. If the super elastic material member(s) need to be heated above their current temperature, then the control module(s) 370 can be configured to selectively permit or increase the flow of electrical energy from the power source(s) 340 to the super elastic material member(s) associated with the connecting members 170. If the super elastic material members 174 need to be cooled below their current temperature, then the control module(s) 370 can be configured to selectively decrease, restrict, or discontinue the flow of electrical energy from the power source(s) 340 to one or more of the super elastic material members 174 associated with one or more of the connecting members 170.

In some arrangements, the control module(s) 370 can be configured to activate a cooling source (e.g., a fan, a blower, a cooler, etc.) to facilitate the cooling of the super elastic material member(s) 174. If the current temperature of the super elastic material member(s) 174 is substantially equal to the target temperature, then the control module(s) 370 can take any suitable action with respect to the flow of electrical energy from the power source(s) 340 to the super elastic material member(s) 174 associated with the connecting member(s) 170 so that the current temperature is maintained. The control module(s) 370 can be configured to send control signals or commands over a communication network 390 to the super elastic material member(s) 174.

In some instances, the control module(s) 370 can be configured to cause the stiffness characteristics of the super elastic material member(s) 174 to be selectively adjusted based on user inputs (e.g., commands). For instance, a user can provide an input on the input interface(s) 350. The input can be to adjust the stiffness characteristics of the super elastic material member(s) 174. The control module(s) 370 can be configured to cause the stiffness characteristics of the super elastic material member(s) 174 to be adjusted in accordance with the user input.

The control module(s) 370 can be configured to control the stiffness characteristics of a plurality of connecting members 170. The control module(s) 370 can be configured to control the stiffness characteristics of the super elastic material member 174 of each connecting member 170 individually. Thus, the adjustment of the stiffness characteristics of one connecting member 170 can be performed independently of the adjustment or non-adjustment of the stiffness characteristics of the other connecting members 170. Alternatively, the control module(s) 370 can be configured to control the stiffness characteristics of a plurality of connecting members 170 collectively. Thus, the stiffness characteristics of each connecting member 170 can be adjusted at substantially the same time, to the same degree of actuations, and/or in substantially the same manner.

The various elements of the system 300 can be communicatively linked to one another or one or more other elements through one or more communication networks 390. As used herein, the term "communicatively linked" can include direct or indirect connections through a communication channel, bus, pathway or another component or system. A "communication network" means one or more components designed to transmit and/or receive information from one source to another. The data store(s) 320 and/or one or more other elements of the system 300 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the connecting member 170 can allow passive movement of the winglets 140, 150 responsive to real-time operational forces acting upon the aircraft. Due to the passive nature of arrangements described herein, there can be any number of combinations of movements of the winglets 140, 150. The connecting member 170 can deflect up or down depending on the direction of the load as well as the distribution of the super elastic material member on the base. Some examples will now be described, but it will be understood that these examples are not intended to be limiting.

Referring to FIGS. 9A-9B, one example of the movement of the winglets 140, 150 is shown. Here, there are upward forces acting upon the first wing 120 at or near the first tip 125, and there are downward forces acting upon the second wing 130 at or near the second tip 135. The forces can be substantially even in the direction of the roll axis R of the aircraft 100. As a result, the first winglet(s) 140 and the second winglet(s) 150 are deflected substantially simultaneously in opposite directions. For instance, the fore winglet 142 and the aft winglet 144 of the plurality of first winglets 140 can be pivoted upward. Further, the fore winglet 152 and the aft winglet 154 of the plurality of second winglets 150 can be pivoted downward.

In the example shown, the fore winglet 142 and the aft winglet 144 of the plurality of first winglets 140 can be pivoted upward at substantially the same angle. Thus, the fore winglet 142 and the aft winglet 144 can be substantially in line with each other. Further, the fore winglet 152 and the aft winglet 154 of the plurality of second winglets 150 can be pivoted downward at substantially the same angle. Thus, the fore winglet 152 and the aft winglet 154 can be substantially in line with each other.

The substantially simultaneous deflection of the first winglets 140 and the second winglets 150 can achieve both roll and yaw moments. As a result, the aircraft 100 can be stabilized and/or gust load alleviation can be achieved.

Further, it will be appreciated that the motions of the first winglets 140 and the second winglets 150 shown in FIGS. 9A-9B can be reversed depending on operational conditions. As a result, a yaw dominant moment in the opposite direction can be achieved.

Referring to FIGS. 10A-10B, another example of the movement of the winglets 140, 150 is shown. Here, there are upward forces acting upon the first wing 120 at or near the first tip 125, and there are downward forces acting upon the second wing 130 at or near the second tip 135.

However, the forces are uneven in the direction of the roll axis R of the aircraft 100. In particular, the forces can be greater toward the front end 112 of the aircraft 100 compared to the back end 114.

As a result, the first winglet(s) 140 and the second winglet(s) 150 are deflected substantially simultaneously in opposite directions. For instance, the fore winglet 142 and the aft winglet 144 of the plurality of first winglets 140 can be pivoted upward. Further, the fore winglet 152 and the aft winglet 154 of the plurality of second winglets 150 can be pivoted downward. With respect to the winglets, the terms "upward" and "downward" can be relative to their respective tip, their respective wing, a substantially horizontal plane, or a non-activated or neutral position.

The fore winglet 142 and the aft winglet 144 of the first winglets 140 can be pivoted at different angles such that they are offset from each other at an angle $\theta_1$. The angle $\theta_1$ can be relatively small. For example, the angle $\theta_1$ can be about 10 degrees or less, about 9 degree or less, about 8 degrees or less, about 7 degrees or less, about 6 degrees or less, about 5 degrees or less, about 4 degrees or less, about 3 degrees or less, about 2 degrees or less or about 1 degree or less. In some arrangements, the angle $\theta_1$ can be greater than 10 degrees. The fore winglet 142 can be pivoted a greater amount than the aft winglet 144. However, in other instances, the aft winglet 144 can be pivoted a greater amount than the fore winglet 142.

The fore winglet 152 and the aft winglet 154 of the second winglets 150 can be pivoted at different angles such that they are offset from each other at an angle $\theta_2$. The above discussion of the angle $\theta_1$ applies equally to the angle $\theta_{21}$. The fore winglet 152 can be pivoted a greater amount than the aft winglet 154. However, in other instances, the aft winglet 154 can be pivoted a greater amount than the fore winglet 152 depending on operational conditions.

The substantially simultaneous deflection of the first winglets 140 and the second winglets 150 can achieve both roll and yaw moments. As a result, the aircraft 100 can be stabilized and/or gust load alleviation can be achieved.

Further, it will be appreciated that the motions of the first winglets 140 and the second winglets 150 shown in FIGS. 10A-10B can be reversed depending on operational conditions. As a result, moments in the opposite direction can be achieved.

Referring to FIGS. 11A-11B, still another example of the movement of the winglets 140, 150 is shown. Here, there are upward and downward forces acting upon the first wing 120 at or near the first tip 125, and there are downward forces acting upon the second wing 130 at or near the second tip 135. With respect to the first wing 120, the forces can be different in the direction of the roll axis R of the aircraft 100. In particular, toward the front end 112 of the aircraft 100, the forces can be in an upward direction, and, toward the back end 114 of the aircraft 100, the forces can be in a downward direction.

With respect to the plurality of first winglets 140, the first winglet(s) 140, the fore winglet 142 can be pivoted upwardly, and the aft winglet 144 can be pivoted downward. There can be any suitable angle $\alpha_1$ between the fore winglet 142 and the aft winglet 144. In one or more arrangements, the angle $\alpha_1$ between the fore winglet 142 and the aft winglet 144 can be relatively large. For example, the angle $\alpha_1$ can be about 90 degrees, about 85 degrees, about 80 degrees, about 75 degrees, about 70 degrees, about 65 degrees, about 60 degrees, about 55 degrees, about 50 degrees, about 45 degrees, or about 40 degrees, just to name a few possibilities. As a result, a roll moment can be achieved in the clockwise direction.

Further, the fore winglet 152 and the aft winglet 154 of the plurality of second winglets 150 can be pivoted downward at substantially the same angle. Thus, the fore winglet 152 and the aft winglet 154 can be substantially in line with each other. However, in some arrangements, the fore winglet 152 and the aft winglet 154 can be slightly offset from each other at an angle.

It will be appreciated that the arrangements shown in FIGS. 11A-111B for the first winglets 140 and the second winglets 150 can be reversed. As a result, a roll moment can be achieved in the opposite direction.

By having an offset between the fore winglet and the aft winglet on one side, can achieve yaw dominant moments. A higher yaw moment can be achieved by including the webbing between the fore winglet and the aft winglet.

Now that the various potential systems, devices, elements and/or components of the aircraft 100 and the system 300 have been described, an example of a method of dynamically adjusting the stiffness of a super elastic material member will now be described. The method described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 12:
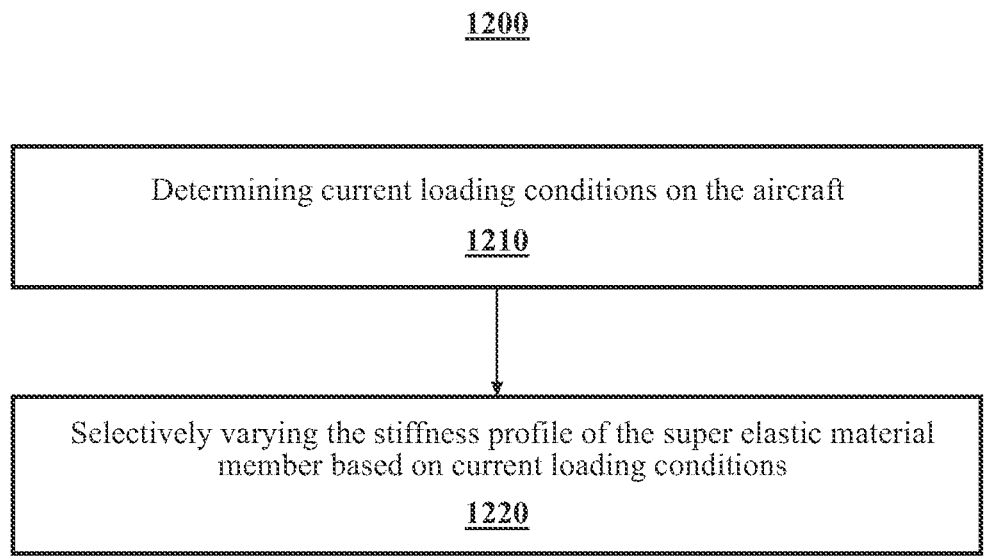
FIG. 12 is an example of a method for an aircraft.

Turning to FIG. 12, an example of a method 1200 is shown. For the sake of discussion, the method 1200 can begin with the super elastic material members 174 being in a non-activated mode. In the non-activated mode, electrical energy from the power source(s) 340 is not supplied to the super elastic material members 174. At block 1210, current loading conditions on the aircraft 100 can be determined. It will be appreciated that the sensor(s) 230 of the aircraft 100 can acquire sensor data about the aircraft 100 itself and/or the surrounding environment. The processor(s) 310 and/or the control module(s) 370 can analyze the acquired sensor data to assess the condition and/or performance of the aircraft 100 and/or the forces acting on the aircraft 100. The method 1200 can continue to block 1220.

At block 1220, the stiffness profile of one or more of the super elastic material members 174 can be selectively varied based on the current loading conditions. Such selective varying can be performed in any suitable manner. For instance, a temperature of the super elastic material member(s) 174 can be controlled. In some arrangements, the control module(s) 370, the processor(s) 310, and/or one or more sensor(s) 330 can control the temperature of the super elastic material member(s) 174 by controlling the supply of electrical energy to the super elastic material member(s) 174.

In one or more arrangements, the control module(s) 370, the processor(s) 310, and/or one or more sensor(s) 330 can be configured to determine a target temperature for the super elastic material member(s) 174 to achieve a target stiffness profile for the super elastic material member(s) 174. Such a determination can be made based on real-time conditions and can include information about the super elastic material member(s) 174, as stored in the data store(s) 320 (e.g., the super elastic material data 322). A current temperature of the super elastic material member(s) 174 can be determined, such as by using data acquired by the super elastic material member temperature sensors 336. The control module(s) 370, the processor(s) 310, and/or one or more sensor(s) 330 can be configured to compare the current temperature of the super elastic material member(s) 174 to a target temperature for the super elastic material member(s) 174. When the current temperature of the super elastic material member(s) 174 is different than the target temperature for the super elastic material member(s) 174, the control module(s) 370, the processor(s) 310, and/or one or more sensor(s) 330 can be configured to cause the supply of electrical energy (e.g., from the power source(s) 340) to the super elastic material member(s) 174 to be adjusted. As a result, the stiffness of the super elastic material member(s) 174 can be selectively varied. When the current temperature of super elastic material member(s) 174 is substantially equal to the target temperature for the super elastic material member(s) 174, the control module(s) 370, the processor(s) 310, and/or one or more sensor(s) 330 can be configured to take no action.

The selective varying can be performed at any suitable time. For instance, the selective varying can be performed continuously, periodically, irregularly, or even randomly. The selective varying can be implemented autonomously by the system 300. In some arrangements, the selective varying can be performed in response to a command (e.g., as provided on the input interface(s) 350) and/or in response to an event or condition(s).

The method 1200 can end. Alternatively, the method 1200 can return to block 1210 or some other block.

As noted herein, there are various scenarios that can occur when the aircraft is in operation. For instance, the wing can roll to the left due to gust. In that situation, the right wing would have higher lift and left wing would have lower lift. As a result, the connecting member 170 on the right wing would bend more than the connecting member 170 on the left wing, thus reducing the lift on the right wing and generating a counter rolling moment, which will eventually stabilize the aircraft. Such deflection profile can provide passive stability due to onset of gust or turbulence in the airflow. The amount of bending and deflection can be designed using different kind of super elastic materials. An example of this scenario is shown in FIGS. 9A-9B above.

In another scenario, the left and right connecting members 170 can deflect in a different pattern dictated by the variation in air load. Such deflection profiles can be used to generate strong rolling motions to counter the forces being generated due to the onset of gust in a passive manner. An example of such a scenario is shown in FIGS. 10A-10B above.

It will be appreciated that arrangements described herein can provide numerous benefits, including one or more of the benefits mentioned herein. For example, arrangements described herein can achieve gust load alleviation, especially when the aircraft flies in high gust. Arrangements described herein can facilitate passive aircraft stability. Arrangements described herein can allow passive movement of winglets responsive to real-time operational forces acting upon the aircraft. Arrangements described herein can facilitate passive aeroelastic control. Arrangements described herein can avoid the use of servo motors or active control. Arrangements described herein can reduce the number of moving parts on the aircraft and can reduce aircraft load.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

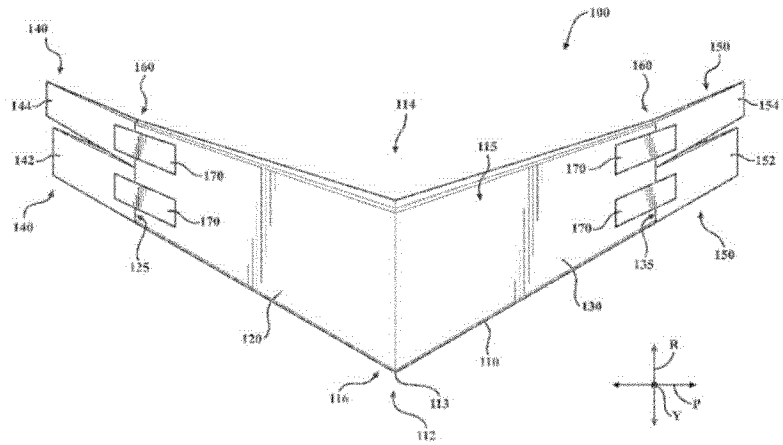

What is claimed is:

1. An aircraft comprising:
    a wing, the wing including a tip;
    a winglet pivotably connected to the wing proximate the tip; and
    a connecting member operatively connected to the wing and the winglet, the connecting member including a flexible material and a super elastic material member operatively connected to the flexible material, the super elastic material member being a wire, the super elastic material member being configured to exhibit a stiffness profile, the stiffness profile being non-linear and including a region of quasi-zero stiffness, whereby the connecting member allows passive movement of the winglet responsive to real-time operational forces acting upon the aircraft, the super elastic material member being arranged in a non-linear pattern on the flexible material, the pattern including a plurality of bends, turns, curves, zig-zags, and/or undulations, the pattern being configured to cause the connecting member to bend, curve, or curl in one or more directions when loaded.

2. The aircraft of claim 1 wherein the flexible material is a fabric.

3. The aircraft of claim 1, wherein the super elastic material member is a wire.

4. The aircraft of claim 1, wherein the flexible material is operatively connected to at least one of:
    a top side of the wing and a top side of the winglet; and
    a bottom side of the wing and a bottom side of the winglet.

5. An aircraft comprising:
    a wing, the wing including a tip;
    a winglet pivotably connected to the wing proximate the tip; and
    a connecting member operatively connected to the wing and the winglet, the connecting member including a flexible material and a super elastic material member operatively connected to the flexible material, the super elastic material member being configured to exhibit a stiffness profile, the stiffness profile being non-linear and including a region of quasi-zero stiffness, whereby the connecting member allows passive movement of the winglet responsive to real-time operational forces acting upon the aircraft,
    the aircraft being a kite.

6. The aircraft of claim 1, wherein the wing is inflatable.

7. A system comprising:
    an aircraft including:
    a wing, the wing including a first tip and a second tip;
    one or more first winglets pivotably connected to the wing proximate the first tip, the one or more first winglets being independently movable from each other;
    one or more second winglets pivotably connected to the wing proximate the second tip, the one or more second winglets being independently movable from each other, the one or more first winglets and the one or more second winglets being independently movable from each other; and
    a plurality of connecting members, each connecting member being operatively connected to the wing and to a respective one of: the one or more first winglets or the one or more second winglets, each connecting member including a flexible material and a super elastic material member operatively connected to the flexible material, the super elastic material member being a wire, the super elastic material member operatively being configured to exhibit a stiffness profile, the stiffness profile being non-linear and including a region of quasi-zero stiffness, whereby the connecting member allows passive movement of the one or more first winglets and the one or more second winglets responsive to real-time operational forces acting upon the aircraft, the super elastic material member being arranged in a non-linear pattern on the flexible material, the pattern including a plurality of bends, turns, curves, zig-zags, and/or undulations, the pattern being configured to cause the connecting member to bend, curve, or curl in one or more directions when loaded.

8. The system of claim 7, further including:
one or more processors operatively connected to selectively vary the stiffness profile of the super elastic material members of the plurality of connecting members by controlling a temperature of the super elastic material members.

9. The system of claim 8, further including:
one or more power sources operatively connected to supply electrical energy to the super elastic material members of the plurality of connecting members, wherein the one or more processors are operatively connected to the one or more power sources, wherein the one or more processors are configured to control the temperature of the super elastic material members by controlling a supply of electrical energy to the super elastic material members based on one or more real-time conditions.

10. The system of claim 9, further including one or more sensors located onboard the aircraft, wherein the one or more sensors are operatively connected to the one or more processors, wherein the one or more sensors are configured to acquire sensor data about a current temperature of the super elastic material members, and wherein the one or more processors are configured to:
compare the current temperature of the super elastic material members to a target temperature for the super elastic material members to achieve a target stiffness profile for the super elastic material members; and
when the current temperature of the super elastic material members is different than the target temperature for the super elastic material members, causing the supply of electrical energy to the super elastic material members to be adjusted.

11. The system of claim 8, further including one or more sensors operatively connected to the one or more processors, wherein the one or more sensors are configured to acquire sensor data about at least one of: the aircraft and an external environment of the aircraft, wherein the one or more processors are configured to selectively vary the stiffness profile of the super elastic material members based on the sensor data.

12. The system of claim 8, wherein the one or more processors are configured to control the temperature of the super elastic material members autonomously.

13. The system of claim 8, wherein the one or more processors are configured to control the temperature of the super elastic material members in response to remote control inputs.

14. The system of claim 7, wherein the flexible material is a fabric.

15. The system of claim 7, wherein the flexible material is operatively connected to at least one of:
a top side of the wing and a top side of a respective one of the one or more first winglets and the one or more second winglets; and
a bottom side of the wing and a bottom side of a respective one of the one or more first winglets and the one or more second winglets.

16. A method for an aircraft, the aircraft including a wing, the wing including a tip, the aircraft including a winglet pivotably connected to the wing proximate the tip, the aircraft including a connecting member operatively connected to the wing and the winglet, the connecting member including a flexible material and a super elastic material member operatively connected to the flexible material, the super elastic material member being a wire, the super elastic material member being configured to exhibit a stiffness profile, the stiffness profile being non-linear and including a region of quasi-zero stiffness, whereby the connecting member allows passive movement of the winglet responsive to real-time operational forces acting upon the aircraft, the method comprising:
selectively varying the stiffness profile of the super elastic material member by controlling a temperature of the super elastic material member,
the super elastic material member being arranged in a non-linear pattern on the flexible material, the pattern including a plurality of bends, turns, curves, zig-zags, and/or undulations,
the pattern being configured to cause the connecting member to bend, curve, or curl in one or more directions when loaded.

* * * * *

UNITED STATES PATENT AND TRADEMARK OFFICE
CERTIFICATE OF CORRECTION

PATENT NO. : 11,939,055 B2
APPLICATION NO. : 17/721931
DATED : March 26, 2024
INVENTOR(S) : Rikin Gupta et al.

It is certified that error appears in the above-identified patent and that said Letters Patent is hereby corrected as shown below:

On the Title Page

Please delete title page and substitute therefore with the attached title page, showing the corrected number of claims In the Specification Column 16, Line 39: delete "angle $\theta_{21}$" and insert --angle $\theta_2$--

In the Claims

Column 20, Lines 28-29, Claim 3: delete claim 3

Column 21, Lines 2-3, Claim 7: delete "super elastic material member operatively being configured" and insert --super elastic material member being configured--

Signed and Sealed this
Twentieth Day of August, 2024

Katherine Kelly Vidal
*Director of the United States Patent and Trademark Office*

CERTIFICATE OF CORRECTION (continued)

(12) United States Patent
Gupta et al.

(10) Patent No.: US 11,939,055 B2
(45) Date of Patent: Mar. 26, 2024

(54) WINGLETS WITH PASSIVE AEROELASTIC TAILORING

(71) Applicant: Toyota Motor Engineering & Manufacturing North America, Inc., Plano, TX (US)

(72) Inventors: Rikin Gupta, Ann Arbor, MI (US); Shardul Singh Panwar, Ann Arbor, MI (US); Taewoo Nam, Ann Arbor, MI (US); Ryohei Tsuruta, Ann Arbor, MI (US); Yufei Zhu, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/721,931

(22) Filed: Apr. 15, 2022

(65) Prior Publication Data
US 2023/0331371 A1    Oct. 19, 2023

(51) Int. Cl.
*B64C 3/38*    (2006.01)
*B64C 23/06*    (2006.01)
(Continued)

(52) U.S. Cl.
CPC .............. *B64C 3/38* (2013.01); *B64C 23/069* (2017.05); *B64C 31/06* (2013.01); *B64D 41/00* (2013.01); *B64C 2031/065* (2013.01)

(58) Field of Classification Search
CPC ... B64C 23/065; B64C 23/069; B64C 23/072; B64C 23/076
See application file for complete search history.

(56) References Cited

U.S. PATENT DOCUMENTS 1,841,921 A    1/1932    Spiegel
2,565,990 A    8/1951    Richard
(Continued)

FOREIGN PATENT DOCUMENTS

CN    105946515 A    9/2016
EP    0772544 B1    2/2005
(Continued)

OTHER PUBLICATIONS

Acet et al., Magnetic-Field-Induced Effects in Martensitic Heusler-Based Magnetic Shape Memory Alloys, 2011, Elsevier, Handbook of Magnetic Materials, vol. 19, pp. 269-271 (Year: 2011).*
(Continued)

*Primary Examiner* — Timothy D Collins
*Assistant Examiner* — Justin Michael Heston
(74) *Attorney, Agent, or Firm* — Christopher G. Darrow; Darrow Mustafa PC

(57) ABSTRACT

An aircraft can include a wing. The wing can include a tip. A winglet can be pivotably connected to the wing proximate the tip. A connecting member can be operatively connected to the wing and the winglet. The connecting member can include a flexible material with a super elastic material member operatively connected to the flexible material. Thus, the connecting member can allow passive movement of the winglet responsive to real-time operational forces acting upon the aircraft. In some arrangements, the flexible material can be a fabric, and the super elastic material member can be a wire. In some arrangements, the super elastic material member can be configured to exhibit a non-linear stiffness profile. The non-linear stiffness profile can include a region of quasi-zero stiffness. The stiffness profile of the super elastic material member can be selectively varied, such as by controlling a temperature of the super elastic material member.

15 Claims, 11 Drawing Sheets